US012776910B2

(12) United States Patent
Osborn et al.

(10) Patent No.: US 12,776,910 B2
(45) Date of Patent: Oct. 27, 2026

(54) PROXY FIDO AUTHENTICATION WITH SIGNED IDENTITY TOKENS

(71) Applicant: Capital One Services, LLC, McLean, VA (US)

(72) Inventors: Kevin Osborn, Newton Highlands, MA (US); Narmeen Rahman, New York, NY (US); John Jones, Leesburg, VA (US)

(73) Assignee: Capital One Services, LLC, McLean, VA (US)

( * ) Notice: Subject to any disclaimer, the term of this patent is extended or adjusted under 35 U.S.C. 154(b) by 111 days.

(21) Appl. No.: 18/987,941

(22) Filed: Dec. 19, 2024

(65) Prior Publication Data

US 2026/0180799 A1 Jun. 25, 2026

(51) Int. Cl.

*H04L 29/06* (2006.01)
*H04L 9/08* (2006.01)
*H04L 9/32* (2006.01)

(52) U.S. Cl.

CPC .......... *H04L 9/3213* (2013.01); *H04L 9/0825* (2013.01); *H04L 9/3271* (2013.01)

(58) Field of Classification Search

CPC ... H04L 9/3213; H04L 9/0825; H04L 9/3271; H04L 63/0861; H04L 63/0815;

(Continued)

(56) References Cited

U.S. PATENT DOCUMENTS 5,590,038 A 12/1996 Pitroda
5,666,415 A 9/1997 Kaufman (Continued)

FOREIGN PATENT DOCUMENTS

CN 101192295 A 6/2008
GB 2516861 A 2/2015

(Continued)

OTHER PUBLICATIONS

The International Search Report and Written Opinion mailed Mar. 3, 2026 for Int. App. No. PCT/US2025/060000 (14 pages).

(Continued)

*Primary Examiner* — Yogesh Paliwal
(74) *Attorney, Agent, or Firm* — KDW Firm PLLC; Andrew D. Kasnevich

(57) ABSTRACT

The present disclosure is directed to a managed cloud-based FIDO authenticator implemented with a distributed switchboard system. The disclosed switchboard implementation enables proxy automation and management of FIDO-related service, including registration and/or access operations, between FIDO service requesting and relying parties. The described process is based on generation of a single pre-validated and personalized identity token, based on validation, tokenization and identity mapping of an identification record associated with a FIDO service-requesting entity (SRE). The generated FIDO identity token can be used as a validity signature for streamlined resolution of identity for generation of FIDO access credentials. The managed FIDO authenticator further provides a FIDO credential management and recovery features for user and/or client applications reliant upon FIDO-authenticated services. The distributed switchboard implementation further enables implementation of a federated FIDO services for a distributed application whereby various FIDO-reliant application components can perform their own FIDO authentication via the distributed switchboard.

20 Claims, 10 Drawing Sheets

100

(58) Field of Classification Search
CPC ............ H04L 63/0884; H04L 63/0876; H04L 9/3231; H04L 63/10; H04W 12/06
See application file for complete search history.

(56) References Cited

U.S. PATENT DOCUMENTS

| | | | |
|---|---|---|---|
| 6,199,114 | B1 | 3/2001 | White |
| 6,324,271 | B1 | 11/2001 | Sawyer |
| 6,367,011 | B1 | 4/2002 | Lee |
| 6,572,015 | B1 | 6/2003 | Norton |
| 7,252,242 | B2 | 8/2007 | Ho |
| 7,270,276 | B2 | 9/2007 | Vayssiere |
| 7,287,692 | B1 | 10/2007 | Patel |
| 7,374,099 | B2 | 5/2008 | de Jong |
| 7,527,208 | B2 | 5/2009 | Hammad |
| 7,568,631 | B2 | 8/2009 | Gibbs |
| 7,584,153 | B2 | 9/2009 | Brown |
| 7,628,322 | B2 | 12/2009 | Holtmanns |
| 7,793,851 | B2 | 9/2010 | Mullen |
| 7,801,799 | B1 | 9/2010 | Brake, Jr. |
| 7,908,216 | B1 | 3/2011 | Davis |
| 7,922,082 | B2 | 4/2011 | Muscato |
| 8,010,405 | B1 | 8/2011 | Bortolin |
| 8,074,877 | B2 | 12/2011 | Mullen |
| 8,082,450 | B2 | 12/2011 | Frey |
| 8,108,687 | B2 | 1/2012 | Ellis |
| 8,186,602 | B2 | 5/2012 | Itay |
| 8,196,131 | B1 | 6/2012 | von Behren |
| 8,249,654 | B1 | 8/2012 | Zhu |
| 8,276,814 | B1 | 10/2012 | Davis |
| 8,332,272 | B2 | 12/2012 | Fisher |
| 8,346,670 | B2 | 1/2013 | Hasson |
| 8,511,547 | B2 | 8/2013 | Rans |
| 8,519,822 | B2 | 8/2013 | Riegebauer |
| 8,750,514 | B2 | 6/2014 | Gallo |
| 8,870,081 | B2 | 10/2014 | Olson |
| 9,038,893 | B2 | 5/2015 | Kirkham |
| 9,129,199 | B2 | 9/2015 | Spodak |
| 9,183,490 | B2 | 11/2015 | Moreton |
| 9,275,325 | B2 | 3/2016 | Newcombe |
| 9,286,606 | B2 | 3/2016 | Diamond |
| 9,306,753 | B1 | 4/2016 | Vandervort |
| 9,501,776 | B2 | 11/2016 | Martin |
| 9,710,744 | B2 | 7/2017 | Wurmfeld |
| 9,949,065 | B1 | 4/2018 | Zarakas |
| 9,965,632 | B2 | 5/2018 | Zarakas |
| 9,965,911 | B2 | 5/2018 | Wishne |
| 9,977,890 | B2 | 5/2018 | Alberti |
| 9,978,056 | B2 | 5/2018 | Seo |
| 9,978,058 | B2 | 5/2018 | Wurmfeld |
| 9,990,795 | B2 | 6/2018 | Wurmfeld |
| 10,007,873 | B2 | 6/2018 | Heo |
| 10,013,693 | B2 | 7/2018 | Wyatt |
| 10,121,130 | B2 | 11/2018 | Pinski |
| 10,210,505 | B2 | 2/2019 | Zarakas |
| 10,242,368 | B1 | 3/2019 | Poole |
| 10,296,910 | B1 | 5/2019 | Templeton |
| 10,332,102 | B2 | 6/2019 | Zarakas |
| 10,360,557 | B2 | 7/2019 | Locke |
| 10,380,471 | B2 | 8/2019 | Locke |
| 10,395,244 | B1 | 8/2019 | Mossler |
| 10,453,054 | B2 | 10/2019 | Zarakas |
| 10,474,941 | B2 | 11/2019 | Wurmfeld |
| 10,475,027 | B2 | 11/2019 | Guise |
| 10,482,453 | B2 | 11/2019 | Zarakas |
| 10,482,457 | B2 | 11/2019 | Poole |
| 10,489,774 | B2 | 11/2019 | Zarakas |
| 10,489,781 | B1 | 11/2019 | Osborn |
| 10,510,070 | B2 | 12/2019 | Wurmfeld |
| 10,515,361 | B2 | 12/2019 | Zarakas |
| 10,535,068 | B2 | 1/2020 | Locke |
| 10,546,444 | B2 | 1/2020 | Osborn |
| 10,581,611 | B1 | 3/2020 | Osborn |
| 10,664,830 | B1 | 5/2020 | Rule |
| 10,685,349 | B2 | 6/2020 | Brickell |
| 10,797,882 | B2 | 10/2020 | Rule |
| 10,880,741 | B2 | 12/2020 | Zarakas |
| 10,909,525 | B1 | 2/2021 | Dhodapkar |
| 10,970,691 | B2 | 4/2021 | Koeppel |
| 10,984,416 | B2 | 4/2021 | Ilincic |
| 11,037,136 | B2 | 6/2021 | Rule |
| 11,062,098 | B1 | 7/2021 | Bergeron |
| 11,120,453 | B2 | 9/2021 | Rule |
| 11,138,593 | B1 | 10/2021 | Ho |
| 11,138,605 | B2 | 10/2021 | Aabye |
| 11,176,540 | B2 | 11/2021 | Gupta |
| 11,188,908 | B2 | 11/2021 | Locke |
| 11,216,806 | B2 | 1/2022 | Mossler |
| 11,297,958 | B2 | 4/2022 | Vukich |
| 11,334,872 | B2 | 5/2022 | Phillips |
| 11,361,173 | B2 | 6/2022 | Edwards |
| 11,392,933 | B2 | 7/2022 | Mossler |
| 11,392,935 | B2 | 7/2022 | Suresh |
| 11,416,844 | B1 | 8/2022 | Osterkamp |
| 11,423,392 | B1 | 8/2022 | Ho |
| 11,443,292 | B2 | 9/2022 | Sherif |
| 11,444,770 | B2 | 9/2022 | Wieker |
| 11,461,764 | B2 | 10/2022 | Rule |
| 11,481,764 | B2 | 10/2022 | Shakkarwar |
| 11,521,213 | B2 | 12/2022 | Rule |
| 11,551,200 | B1 | 1/2023 | Cook |
| 11,556,918 | B2 | 1/2023 | Mestre |
| 11,615,395 | B2 | 3/2023 | McHugh |
| 11,777,933 | B2 | 10/2023 | Moreton |
| 2003/0220876 | A1 | 11/2003 | Burger |
| 2005/0156026 | A1 | 7/2005 | Ghosh |
| 2005/0228997 | A1 | 10/2005 | Bicker |
| 2005/0269402 | A1 | 12/2005 | Spitzer |
| 2007/0276765 | A1 | 11/2007 | Hazel |
| 2008/0082452 | A1 | 4/2008 | Wankmueller |
| 2008/0099552 | A1 | 5/2008 | Grillion |
| 2009/0143104 | A1 | 6/2009 | Loh |
| 2009/0235339 | A1 | 9/2009 | Mennes |
| 2009/0282264 | A1 | 11/2009 | Amiel |
| 2011/0113245 | A1 | 5/2011 | Varadarajan |
| 2011/0155801 | A1 | 6/2011 | Rowberry |
| 2012/0143703 | A1 | 6/2012 | Wall |
| 2013/0030997 | A1 | 1/2013 | Spodak |
| 2013/0146657 | A1 | 6/2013 | Graef |
| 2013/0211937 | A1 | 8/2013 | Elbirt |
| 2013/0311363 | A1 | 11/2013 | Ramaci |
| 2014/0074637 | A1 | 3/2014 | Hammad |
| 2014/0074655 | A1 | 3/2014 | Lim |
| 2014/0081785 | A1 | 3/2014 | Valadas Preto |
| 2014/0365377 | A1 | 12/2014 | Salama |
| 2015/0032635 | A1 | 1/2015 | Guise |
| 2015/0073983 | A1 | 3/2015 | Bartenstein |
| 2015/0113271 | A1 | 4/2015 | Jooste |
| 2015/0134513 | A1 | 5/2015 | Olson |
| 2015/0199673 | A1 | 7/2015 | Savolainen |
| 2015/0199863 | A1 | 7/2015 | Scoggins |
| 2015/0254637 | A1 | 9/2015 | Yang |
| 2015/0317295 | A1 | 11/2015 | Sherry |
| 2016/0078430 | A1 | 3/2016 | Douglas |
| 2016/0189143 | A1 | 6/2016 | Koeppel |
| 2016/0253651 | A1 | 9/2016 | Park |
| 2016/0277383 | A1 | 9/2016 | Guyomarc'h |
| 2016/0307189 | A1 | 10/2016 | Zarakas |
| 2016/0314472 | A1 | 10/2016 | Ashfield |
| 2016/0379217 | A1 | 12/2016 | Hammad |
| 2017/0017957 | A1 | 1/2017 | Radu |
| 2017/0039566 | A1 | 2/2017 | Schipperheijn |
| 2017/0068950 | A1 | 3/2017 | Kwon |
| 2017/0330173 | A1 | 11/2017 | Woo |
| 2018/0039987 | A1 | 2/2018 | Molino |
| 2018/0268132 | A1 | 9/2018 | Buer |
| 2018/0300716 | A1 | 10/2018 | Carlson |
| 2019/0172055 | A1 | 6/2019 | Hale |
| 2019/0222424 | A1* | 7/2019 | Lindemann ........... H04L 9/3231 |
| 2019/0303945 | A1 | 10/2019 | Mitra |
| 2020/0336308 | A1* | 10/2020 | Deutschmann ......... H04L 9/088 |
| 2021/0004806 | A1 | 1/2021 | Noe |
| 2021/0058256 | A1* | 2/2021 | Nishimura ............ G06F 21/335 |
| 2021/0272098 | A1 | 9/2021 | Delsuc |

(56) References Cited

U.S. PATENT DOCUMENTS

| | | | | |
|---|---|---|---|---|
| 2021/0304189 | A1 | 9/2021 | Gupta | |
| 2021/0383360 | A1 | 12/2021 | Sinha | |
| 2021/0392003 | A1* | 12/2021 | Law | H04L 9/0897 |
| 2021/0406869 | A1 | 12/2021 | Pathrabe | |
| 2022/0114581 | A1 | 4/2022 | Upadhye | |
| 2022/0284416 | A1 | 9/2022 | Rule | |
| 2022/0309509 | A1 | 9/2022 | Akgun | |
| 2022/0335412 | A1 | 10/2022 | Rule | |
| 2022/0366410 | A1 | 11/2022 | Rule | |
| 2022/0398566 | A1 | 12/2022 | Rule | |
| 2022/0405766 | A1* | 12/2022 | Rule | G06Q 20/40975 |
| 2022/0414648 | A1 | 12/2022 | Rule | |
| 2022/0417020 | A1* | 12/2022 | Gomi | H04L 9/0869 |
| 2023/0054157 | A1 | 2/2023 | Mao | |
| 2023/0065163 | A1 | 3/2023 | Vargas | |
| 2023/0083785 | A1 | 3/2023 | Maiman | |
| 2023/0169505 | A1 | 6/2023 | Rule | |
| 2023/0171252 | A1* | 6/2023 | Stocker | H04L 63/0884 726/5 |
| 2023/0354020 | A1 | 11/2023 | Rule | |
| 2023/0359839 | A1 | 11/2023 | Lovgren | |
| 2025/0097212 | A1* | 3/2025 | Ihsanullah | H04L 63/0442 |
| 2026/0100841 | A1* | 4/2026 | Cárdenes Cabré | H04L 63/0807 |

FOREIGN PATENT DOCUMENTS

| | | | |
|---|---|---|---|
| GB | 2551907 | A | 1/2018 |
| KR | 20150140132 | A | 12/2015 |
| WO | 9910824 | A1 | 3/1999 |
| WO | 0049586 | A1 | 8/2000 |
| WO | 2013155562 | A1 | 10/2013 |
| WO | 2015183818 | A1 | 12/2015 |
| WO | 2017047855 | A1 | 3/2017 |
| WO | 2019022585 | A1 | 1/2019 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Schwarz et al., "FelDo: Recoverable FIDO2 Tokens Using Electronic IDs", CCS '22: Proceedings of the 2022 ACM SIGSAC Conference on Computer and Communications Security, pp. 2581-2594, Nov. 7, 2022, https://doi.org/10.1145/3548606.3560584.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

EMVCo, LLC, "EMV Card Personalization Specification," Version 1.0, (2003) 81 pages.

EMVCo, LLC, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.

EMVCo, Llc, "Emv Card Personalisation Specification," Aug. 1, 2021, pp. 1-114, Retrieved from Internet URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

280

400

700

| 702 | 704 | 706 | 708 | 710 | 712 | 714 | 716 |
|---|---|---|---|---|---|---|---|
| APP VER. | IDI | ISSUER ID | pKEY ID | pUID | pATC | NONCE | CRYPTOGRAM |

| | 720 | 722 |
|---|---|---|
| 702 | Major Version | Fixed in Software<br>2 bytes of ASCII HEX encoded 1 bytes binary data |
| 704 | Issuer Discretionary Indicator | Set at Personalisation<br>2 bytes of ASCII HEX encoded 1 bytes binary data |
| 706 | pIssuerID | Set at Personalisation<br>6 bytes of ASCII HEX encoded 3 bytes binary data |
| 708 | pKeyID | Set at Personalisation<br>6 bytes of ASCII HEX encoded 3 bytes binary data |
| 710 | pUID | Set at Personalisation<br>16 bytes of ASCII HEX encoded 8 bytes binary data |
| 712 | pATC | Set at Personalisation and updated on each transaction<br>8 bytes of ASCII HEX encoded 4 bytes binary data |
| 714 | Nonce | Value of the nonce used in enciphered cryptogram calculation<br>8 bytes of ASCII HEX encoded 4 bytes binary data |
| 716 | Enciphered Cryptogram | 32 bytes of ASCII HEX encoded 16 bytes binary data |

718

FIG. 7

PROXY FIDO AUTHENTICATION WITH SIGNED IDENTITY TOKENS

The present disclosure relates generally to source authentication in electronic transactions and, more specifically, to exemplary systems, methods, and computer-accessible mediums for implementation of managed Fast Identity Online (FIDO) authentication.

BACKGROUND

Hardware identity authenticators, such as transaction cards, are subject to loss, which would mean that any security key information stored thereon is lost or at risk of being compromised. The security keys may be associated with access (e.g., FIDO-authenticated access) to various specific sites that were generated and stored during a registration phase of the lost device with the aforementioned FIDO relying sites. Therefore, a user will have to re-register with every site to which he or she previously had access with the security keys that were on the lost or stolen authenticator device.

In some instances, security keys can be backed up on an external storage device. However, even if lost security keys were to be backed up on an external storage device and subsequently restored onto a replacement authenticator device, the replacement authenticator device would not be tied to a verified user identity, and therefore must perform individual registration for each re-stored key, meaning that each key restored on the replacement authenticator device may be required to be individually re-registered with the new authenticator device.

Furthermore, direct registration with FIDO relying parties (RP) may require identity verification for the user. This can create privacy concerns with respect to exposure of identification data to a third-party actor (e.g., a website associated with a FIDO RP).

These and other deficiencies exist. Therefore, there is a need for system and process to enable anonymous and versatile management of access security with protocols such as FIDO and FIDO2.

SUMMARY OF THE DISCLOSURE

One aspect of the disclosure is directed to implementation of a proxy FIDO service application for provision of FIDO related service (e.g., FIDO registration and authentication) based on a pre-validated user identity token (signed by a validating and/or issuing entity) implemented through a distributed switchboard application. The distributed switchboard application may have a plurality of application components for establishing security and identity/provenance verification. The application components may communicate with one another and external entities using symmetric and or asymmetric cryptography.

Some aspect of the present disclosure are directed to a method for a proxy implementation of Fast Identity Online (FIDO) service with a distributed switchboard, the method comprising: initiating, by the distributed switchboard, a FIDO registration operation between a service requesting entity (SRE) and a target FIDO relying party (RP), using a first client identifier associated with the SRE, and a site identifier associated with the target FIDO RP, wherein the FIDO registration operation comprises; obtaining a validation token by authenticating the first client identifier using a first service associated with a validator entity; generating, from the first client identifier and the validation token, a FIDO identity (FID) token uniquely identifying the SRE; and deriving, based on the FID token, a site-specific FIDO security key pair for the target FIDO RP, the site-specific FIDO security key pair comprising a site-specific public key and a site-specific private key private key diversified using the site identifier of the target FIDO RP. The method further comprising storing, by the distributed switchboard, the site-specific private key, wherein the site-specific private key is mapped to one or more of the FID token, the first client identifier, and the site identifier of the target FIDO RP.

The method may further comprise: initiating, by the distributed switchboard, a FIDO authentication operation between the service requesting entity (SRE) and the target FIDO relying party (RP), using the FID token, wherein the FIDO authentication operation comprises: signing a FIDO challenge received from the target FIDO RP using the private key, wherein the private key is stored by the distributed switchboard, and associated with one or more of the FID token, the first client identifier, the second client identifier, and the site identifier of the target FIDO RP; and transmitting, by the switchboard, the signed FIDO challenge and the second client identifier to the target FIDO RP, wherein upon validation of the signed FIDO message using the public key, a FIDO-authenticated access is provided to the SRE.

Some aspect of the present disclosure are directed to a managed cloud-based Fast Identity Online (FIDO) authenticator system comprising: a distributed switchboard system in communication with a plurality of FIDO service requesting entities (SRE) and a plurality of FIDO relying parties (RP), wherein the switchboard is configured to: obtain a validation token by transmitting a received first client identifier, associated with an SRE, to a validator entity, and receiving a validation token responsive to a successful authentication of the received first client identifier, from the validator entity; map the received first client identifier to a second client identifier retrieved from a data store, wherein the second client identifier is associated with the SRE; generate a FIDO identity (FID) token, for the SRE, using the validation token and the second client identifier; in response to a FIDO service request from an SRE, compute a FIDO security key pair based on the FID token associated with the SRE, wherein the FIDO security key pair is specified to a target FIDO RP using a first site identifier included in the FIDO service request; sign a FIDO challenge, received from the target FIDO RP, using a site-specific private key associated with the FIDO security key pair; and transmit the signed FIDO challenge and the second client identifier to the FIDO RP; and upon validation of the signed FIDO message, by the FIDO RP, using a site-specific public key associated with the FIDO security key pair, provide the SRE with a FIDO-authenticated access to the FIDO RP.

Some aspects of the present disclosure are directed to a non-transitory computer medium comprising a processor and memory, the memory storing instructions that when executed by the processor, causes the processor to perform steps comprising: obtaining a validation token by authenticating a first client identifier associated with a first FIDO service request, wherein the validation token is obtained in response to an authentication of the first client identifier by a validator entity associated with a first service-requesting entity (SRE); retrieving a second client identifier from an identity system of records, wherein the second client identifier is obtained in response to mapping the first client identifier to the second client identifier associated with the SRE; generating a FIDO identity (FID) token from the second client identifier and the validation token, wherein the FID token uniquely identifies and validates the SRE for initiating FIDO transactions; and deriving, based on the FID token, one or more site-specific FIDO security key pairs for one or more target FIDO relying parties (RP), wherein one or more site-specific private keys associated with the one or more site-specific FIDO security key pairs, are stored in association with the FID token and the second client identifier; responding to the first FIDO service requests by signing a FIDO challenge, retrieved from a corresponding FIDO RP, with a site-specific private key associated with the corresponding FIDO RP and returning the signed FIDO challenge along with the second client identifier to the target FIDO RP; and providing the first SRE with a FIDO-authenticated access to the RP in response to a successful validation of the signed FIDO challenge by the target FIDO RP.

BRIEF DESCRIPTION OF THE DRAWINGS

FIG. 7 illustrates an exemplary data frame that may be communicated to the switchboard system by a service-requesting device, in accordance with example embodiments.

DETAILED DESCRIPTION

Figure 1:
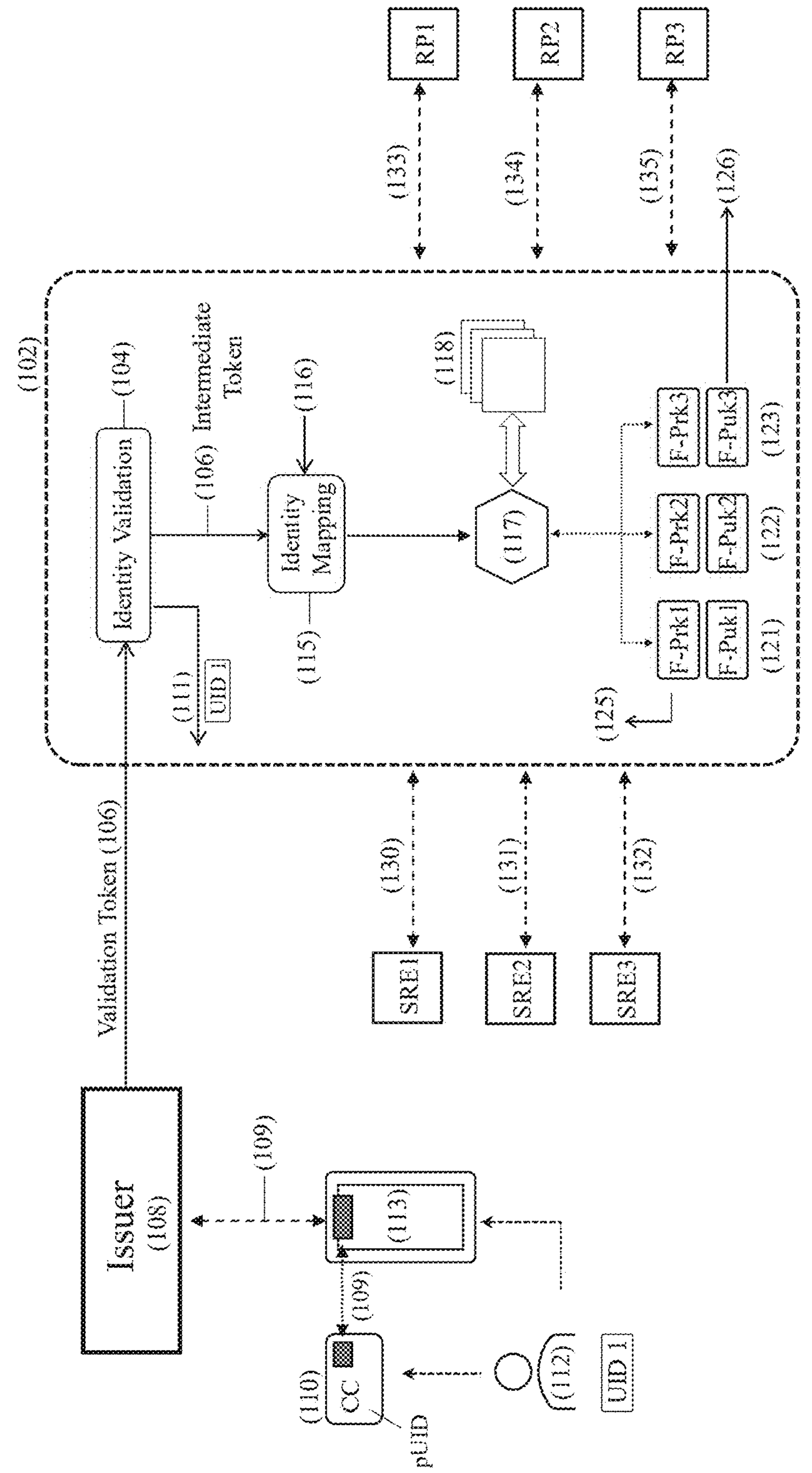
FIG. 1 illustrates an overview of an exemplary process for anonymous management of FIDO services based on a distributed switchboard system shared between FIDO service-requesting and service-providing entities, in accordance with example embodiments.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The described features and teachings of the embodiments may be combined in any suitable manner. A person of ordinary skill in the art will recognize that the embodiments may be practiced without one or more of the specific features and teachings of an embodiment. In other instances, additional features and teachings may be recognized in certain embodiments that may not be present in all embodiments. A person of ordinary skill in the art will understand that the described features and teachings of any embodiment can be interchangeably combined with the features and teachings of any other embodiment.

Example embodiments of the present disclosure are directed to a distributed Fast Identity Online (FIDO) management system for creating a federated FIDO authentication application servicing multiple different user and/or system applications that rely on FIDO authenticated services. Accordingly, one performance aspect of the systems and process described herein is privacy preservation for a plurality of clients while enabling automated (cloud-based) FIDO-related services and data recovery functionalities on behalf of the aforementioned plurality of clients.

Another aspect of the disclosure described a switchboard-based managed FIDO authenticator with key recovery features, transparently facilitating FIDO communications for various distinct users and/or applications. The cloud-based FIDO authenticator may be implemented with a distributed switchboard. The aforementioned implementation enables key derivation and recovery based on a pre-validated and personalized identity token created by the switchboard.

The switchboard system interfacing between the FIDO SREs and FIDO RPs, may communicate with various SREs and acts on their behalf for brokering all FIDO-related credential management and communications with respective FIDO relying parties. This may include the FIDO registration services with a FIDO RP comprising generation of site-specific FIDO public/private keys, as well as associating each pair of site-specific FIDO keys to an authenticated and personalized identity token which uniquely and anonymously identifies a service-requesting party (e.g. the client) to all FIDO relying (RP) parties and FIDO accounts associated with an SRE and/or a user. Accordingly, the SREs may be registered with a number of FIDO relying services and/or sites through the switchboard system.

The FIDO operation undertaken by the switchboard on behalf of the client and/or service-requesting entities may also include FIDO authentication process including acquisition of a FIDO challenge and signing of the FIDO challenge with an appropriate FIDO private key associated with the specific (FIDO) relying party. Accordingly, the switchboard may perform both registration and authentication related functions related to provisioning of managed FIDO-authenticated service, and thus serving as a proxy FIDO management system for a plurality of SREs. In some examples, an SRE may be a mobile browser application executing on a client device and the identification data may correspond to an identifier stored on a user device and retrieved, therefore. In some examples, an SRE may be an application and/or a microservice in a distributed application that is reliant on FIDO-authentication services for one or more operations, wherein the FIDO identity (FID) token is generated by retrieving a validation token via one or more communication exchanges with a validating entity associated with a service-requesting entity and mapping the validation token onto a client identifier.

FIG. 1 illustrates an operational overview 100 of an exemplary distributed switchboard system 102 configured for implementing a managed cloud-based FIDO service operations between one or more SREs and one or more corresponding FIDO RPs. As illustrated by example 100 of FIG. 1, FIDO-related services, with the FIDO relying parties (e.g., RP1-RP3), may be carried out via proxy, by the distributed switchboard implementation 102, on behalf of the client and/or service requesting entities (e.g., SRE1-SRE3). FIG. 1, illustrates the shared characteristic of a distributed switchboard (SB) system/service 102, as shared between client/service-requesting entities (E.g., SRE1-SRE3), and one or more FIDO service providers such as FIDO relying parties RP1-RP3.

In accordance with some embodiments, the operation of the switchboard 102 is facilitated by acquisition and verification of a pre-validated/signed validation token as shown by the exemplary process 104 executing on the switchboard 102. A validation token 106 may be generated, for an SRE and/or client entity, by a corresponding issuing entity 108. The validation token may be generated in response to, for example, to a validation request 111 generated by the switchboard system 102 on behalf an SRE initiating a FIDO-related service request. In accordance with the aforementioned arrangement, the SRE may correspond to user 112 (e.g., associated with a identifier UID 1) initiating a FIDO-related request message via mobile browser executing on a user mobile device 113.

Returning back to example 100 of FIG. 1, the generation of a pre-validated and personalized identity token 106, which uniquely identifies user 112, may be initiated by the generation and transmission of a validation request to a corresponding issuing/validation entity (e.g., issuer 108) for authenticating one or more SREs managed by the switchboard 102. For example, validation request 111 may correspond to a request for authentication of the user identifier UID 1 received from an SRE. The validation request 111 may be sent to a validation entity (e.g., issuer 108, associated with a corresponding SRE and communicatively coupled with the switchboard 102). The issuing entity/server 108 may then initiate a set of operations for generating a validation token 106 for a specific client and/or FIDO service-requesting entity such as user 112, or a device uniquely associated with the user (e.g., contactless card 110 and/or mobile device 113). In accordance with the exemplary embodiment 100, the generation of the validation token 106 may involve retrieving an encrypted authentication record 109 from a device associated with the service-requesting client 112. The device may be a contactless card 110 storing identification data regarding user 112 and/or a user account maintained by the issuer 108. In the example shown in FIG. 1, the card-stored identification data may be retrieved, via short-range wireless communication, by a reading device, such as the mobile communication device 113, and transmitted over a network to a validation and/or authentication server associated with the issuer 108. The issuer may then authenticate the received identification record 109 (which may or may not be encrypted) and generate a validation token 106 based on an authentication of the identification data 109 retrieved from a source device associated with the service-requesting entity (e.g., contactless card 110 and/or mobile computing/communication device 113 associated with user 112).

As described above, with reference to the exemplary representation 100, the validation token 106 may be generated based on successful validation of encrypted authentication data 109 retrieved from a user contactless card 110, via a user intermediary device 113, and transmitted, via the intermediary device 112, to an authentication server associated with the issuing entity 108. The switchboard 102 may perform a verification operation 104 for verifying a signature of the issuing party. Upon verifying the token as valid, the pre-validated and/or signed identity token 106, in accordance with some embodiments, may be used by the switchboard 102 for uniquely identifying a corresponding SRE and/or user to all FIDO RPs for which a FIDO access request is issued.

In other embodiments, as further illustrated by the exemplary implementation 100, the validation token 106 may be computed based on a device identifier uniquely identifying a specific client device (e.g., contactless card 110 and/or mobile device 113), and as such may not represent a directly identifiable data for uniquely identifying the client entity (e.g., user 112). In such instances, the switchboard 102 may further process the validation token 106, as shown by the identity mapping process and/or module 115, in order to link and/or map the (intermediate) validation token 106 to a primary user and/or client identifier (e.g., a stored client identifier associated with a primary financial account.)

In some embodiments, a (primary) client identifier 116 for mapping onto the validation token 106 may be retrieved via interaction with an identity record management database (not shown) associated with and/or communicatively coupled to the distributed switchboard 102. As such, by associating the validation token 106 (signed by the issuer 108) with a primary client and/or SRE identifier 116, a pre-validated and/or signed and personalized identity token 117 may be generated which uniquely and anonymously identifies a service-requesting party (e.g., the client), and serves as a single FIDO identity to which all FIDO accounts associated with various FIDO relying parties may be tied to. In some embodiments the personalized pre-validated identity token may server as a FIDO identity token to obviate the cumbersome identity verification phase associated with FIDO registration process.

Referring back to FIG. 1, the FIDO identity token 117 may be used as a proof of validity for generation of site-specific FIDO security key pairs for each FIDO relying site (e.g., FIDO security key pairs 121, 122, 123 associated respectively with RP1, RP2 and RP3). The site-specific FIDO security keys may be generated based on specific site identifiers associated with each FIDO RP. In some embodiments, the generated FIDO public/private key pairs may be diversified using the specific site identifier for each corresponding FIDO relaying party. With reference to exemplary representation 100, each of the site-specific FIDO security key pairs 121-123, include a FIDO private key, denoted as F-Prk 1-3, and a corresponding FIDO public key, denoted as F-PuK 1-3, respectively. Accordingly, with reference to FIG. 1, the site-specific FIDO security key pairs 121, 122 and 123 are generated, respectively, for corresponding FIDO RPs (e.g., RP1-RP3), based on the proof of validity provided by the FIDO identity token 117. Site identifiers for various FIDO relying sites (e.g., RP1-RP3) may be included in data records 118 stored on the switchboard and mapped to the FID token 117. In some embodiments, the site-specific private key may be stored and/or maintained by the switchboard 102 and the site-specific FIDO public key may be transmitted to the corresponding RP server, As shown by data operation and/or communication 125 and 126, respectively.

As described above with reference to exemplary FIDO-by-proxy implementation 100, the switchboard 102 may communicate with various SREs (e.g., FIDO request/response communications 130-132) and acts on their behalf for brokering all FIDO-related credential management and communications (e.g., FIDO-related communications 133-135) with respective FIDO relying parties. This may include the FIDO registration services with a FIDO RP comprising generation of site-specific FIDO public/private keys, as well as associating each pair of site-specific FIDO keys to an authenticated and personalized identity token (e.g., FIDO identity token 117) which uniquely and anonymously identifies a service-requesting party (e.g., user 112 and/or client application running on a user device 113) to all FIDO relying parties (RPs) and user accounts.

The FIDO registration operation, conducted by proxy, on behalf of a client and/or SRE entity, may further comprise communication of site-specific FIDO public keys to a corresponding FIDO relying party to be used in validation of the signed FIDO challenge issued therefrom. upon validation of the signed FIDO message, by the a target FIDO RP, using a corresponding public key, FIDO-authenticated access may be provided to the SRE. Accordingly, the service-requesting entities may be registered with a number of FIDO relying services and/or sites through the switchboard system 102.

The FIDO operations undertaken by the switchboard 102 on behalf of the client and/or service-requesting entities may also include FIDO authentication process including acquisition of a FIDO challenge and signing of the FIDO challenge with an appropriate FIDO private key associated with the specific FIDO relying party. Accordingly, the switchboard may perform both registration and authentication related functions related to provisioning of managed FIDO-authenticated service. Therefore, the distributed switchboard 102 may serve as a proxy FIDO management system for a plurality of service requesting entities. In some examples the SRE may be a mobile browser application executing on a client device (e.g., mobile device 113) and the identification data 109 may correspond to a card-specific identifier (pUID) retrieved from the user contactless card 110. In some example, as will be described later, an SRE may correspond to an application and/or a microservice in a distributed application that is reliant on FIDO-authentication services for one or more its operations.

As described with respect to the exemplary embodiment 100, illustrated in FIG. 1, the cloud-based switchboard system (e.g., switchboard 102) facilitates FIDO registration and/or authentication related communications between service requesting entities (SRE1-SRE3), also referred to as client entities, and the FIDO relying sites and/or servers (RP1-RP3). The operations of the switchboard may not be transparent to either or both of the FIDO requesting and relying entities. Therefore, client-side FIDO related communications between the switchboard and the service-requesting entities SRE1-SRE3 (e.g., FIDO-related communications 130-132) and service-side FIDO related communications between the switchboard and the FIDO service-providing RP1-RP3 (e.g., FIDO-related communications 133-135) may correspond to standard FIDO interactions form a point of view of the FIDO service requesting entities and/or the FIDO relaying parties.

Figure 2A:
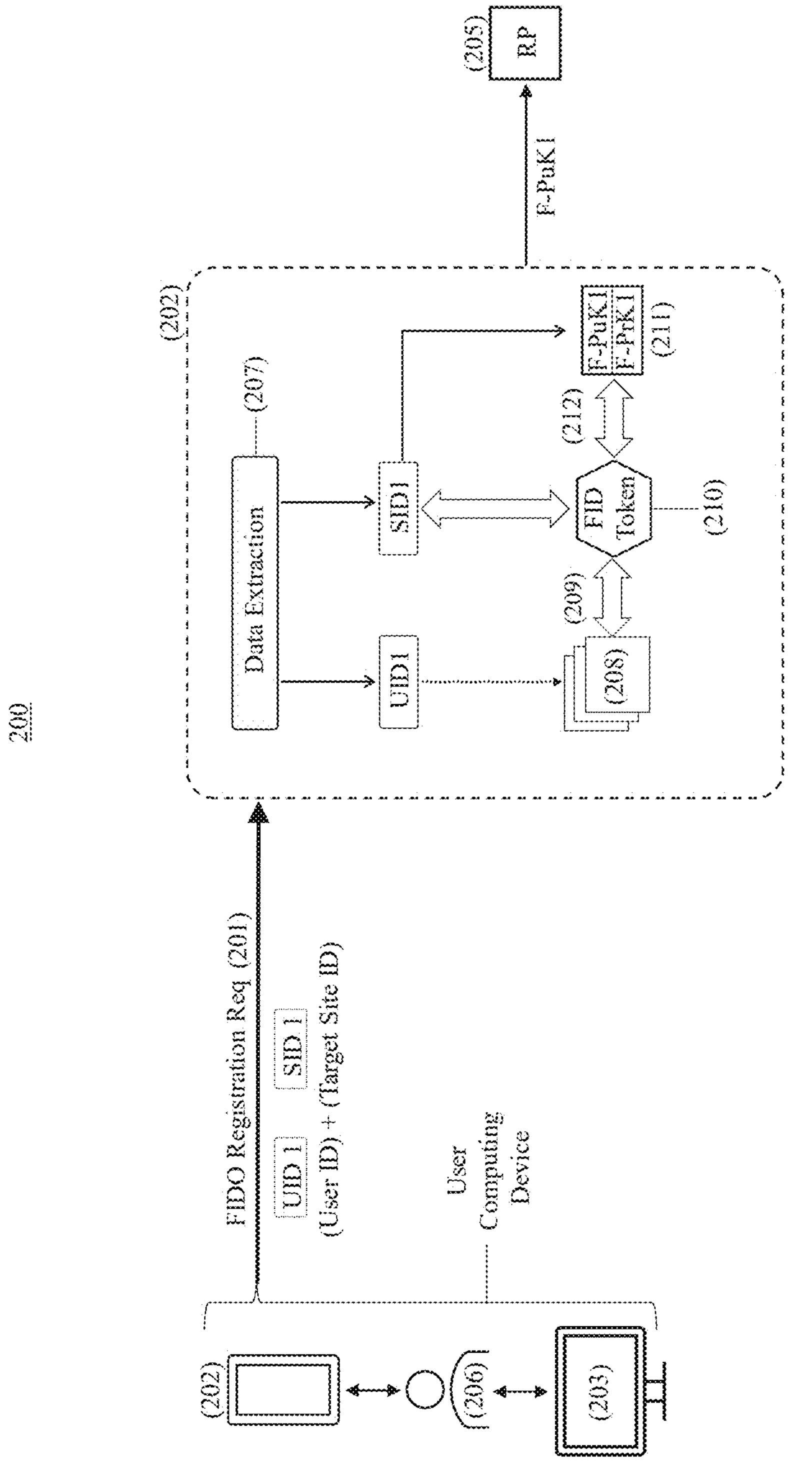
FIG. 2A illustrates an exemplary process for generation and management of site-specific FIDO credentials in response to a user-initiated FIDO registration request for a target FIDO relying site, in accordance with example embodiments.

FIG. 2A illustrates an exemplary process for a switchboard facilitated management of user-initiated Fast Identity Online (FIDO) registration process. A FIDO registration request for a specific FIDO site and/or service may be initiated from a user device or a user application reliant upon FIDO-authenticated services. The registration request may be re-directed to the switchboard system to facilitate the FIDO registration process with the requested FIDO website and/or service. Incorporation of the switchboard system in this way enables key management and/or recovery, whereby user-specific FIDO credentials for each of one or more FIDO RP sites is generated and/or retrieved and stored and/or managed by the cloud-based switchboard system. In some implementation of the cloud-based managed FIDO authenticator, FIDO registration process with a specific FIDO relying party and/or site (RP) may be initiated by a user (e.g., a browser-based request initiated from a browser application executing on the user device). An exemplary implementation of user-initiated registration facilitated via the distributed switchboard system is illustrated in FIG. 2A. FIG. 2A illustrates an exemplary embodiments 200 in which a FIDO registration request 201 for a specific FIDO-relying service/site 205 is initiated from a user computing and/or communication device (e.g., mobile device 202 and/or computing device 203). The registration request 201 is then re-directed to the switchboard system 202 to facilitate the FIDO registration process with the requested website and/or service (205).

Referring back to exemplary representation 200, the distributed switchboard 202 receives a transmission request message 201 comprising a request for a FIDO reliant service 205. The transmission request message 201 may further comprise an identification record (e.g., UID 1) associated with the service-requesting entity (e.g., User 206) and a site identifier (e.g., SID 1) associated with a target FIDO relying service and/or party 205. The switchboard 202 may extract and retrieve one or more user and/or site identifiers associated with a FIDO service request message (e.g., incoming FIDO registration request 201.) With reference to the exemplary switchboard system implementation 200 of FIG. 2A, a data parsing process and/or module 207 may be invoked for extracting required identifier information from the incoming FIDO request message 201.

In some embodiments, as described above, the request message 201 may comprise a FIDO registration request with a target FIDO relying site and/or service 205. The target FIDO relying site 205 may then be identified by a site identifier (E.g., SID 1) which may be included in the transmission request message 201. In some embodiments, the client-initiated request message may further include a source identifier (e.g., UID and/or pUID) identifying a user and/or a user device uniquely associated with the user (e.g., contactless card 110 and/or user communication device 202 and/or computing device 203).

In some embodiments, the exemplary switchboard (SB) system 202 may store a plurality of UID records 208 and mappings 209 between the UID records 208 (associated with a same user, such as user 206) and a corresponding FIDO identity token 210 that uniquely and anonymously identifies and authenticates the user (e.g., user 206). If the SB 202 determines that an extracted user identification data (e.g., UID) from an incoming FIDO request message, matches a stored UID that is already mapped to an existing FIDO identity token, the respective FID token may then be used for secure derivations of a FIDO security key pair for a requested FIDO service and/or site. A site-specific key pair may then be generated by diversifying the key generation process using the site identifier. In some embodiments the FIDO security keys are specified to a target FIDO RP based on a site identifier that may be included in a FIDO service request.

In some embodiments, a FIDO registration request message may further include an identity token retrieved from example, from a user authenticator device (e.g., contactless card and/or mobile device), the identity token may be pre-validated by an issuing entity and signed with a security key of the respective issuing entity. In such embodiments the signed validation token may be separately acquired via direct client to validator interaction and sent to the SB along with a FIDO access request to a desired online site and/or service. In some embodiment the validation and tokenization of the retrieved user identification data (e.g., user-specific identifier such as a UID, and/or user device-specific identifier, such as a pUID) may be carried out by the switchboard system via communication with a validation and/or issuing server associated with the user account. The switchboard system may then derive a personalized validation token by mapping the validation token to a persistent and/or primary client identifier (e.g., retrieve, from an identity management record database). Accordingly, the switchboard system may derive site-specific FIDO key pairs based on the generated FIDO identity token, using diversification methods and distinct site identifiers for various FIDO-relaying sites and/or services.

Referring back to exemplary switchboard implementation 202 in FIG. 2A, based on the identify validation provided by the FIDO identity token 210, the switchboard may derive the site-specific security key pair 211 (for the target FIDO RP 205) based on the site identifier SID 1 extracted from the FIDO service request message 201. The generated security key pair 211, including a FIDO public key (F-PubK1) and a FIDO private key F-PrK1, may then be stored, by the switchboard system 202, as part of data mapped to the FIDO identity token 210 (e.g., as shown by mappings 209 between the FIDO key pair 211 and a corresponding FIDO identity token 210 that uniquely and anonymously identifies and authenticates the user 206).

In accordance with the aforementioned embodiments, since a site identifier for a target FIDO relying site is extracted from the initial FIDO service request (e.g., FIDO registration request 201), site-specific keys may be derived without communication and/or contact with a server associated with the FIDO relying party 205. Accordingly, the only contact with the FIDO relying party 205, for completing the registration process may correspond to the transmission of the corresponding FIDO public key (F-PubK1) and a client identifier (e.g., client identifier 116), to the RP server. In some embodiments, the switchboard 202 may forwards the request to a corresponding FIDO RP identified by the user-provided site identifier and receive therefrom an RP-issued site identifier. The RP-provided site identifier may then be used in generation of the site-specific FIDO security key pair for the FIDO RP 205.

In some embodiments, as further illustrated with reference to FIG. 2C, the transmission request message 201 may correspond to a FIDO access and/or authentication request for a FIDO reliant site and/or service. Upon receiving the transmission request message and determining that the received transmission corresponds to a FIDO access and/or registration request, the switchboard 202 may search for an existing mapping 209 between a pre-validated identity token (e.g., FIDO token 210) and a user identifier, associated with stored records 208, that matches the source identifier received and extracted from the FIDO request message. In some embodiments the source identifier extracted from the received FIDO request message may not be mapped to an existing records in the switchboard and/or a data repository accessible by the switchboard (e.g., not found in data records 208). The switchboard may then validate and tokenizes the source identifier (e.g., UID1) via interactions with a validation entity associated with the FIDO service requesting user and/or client.

In some cases, the source identifier (e.g., UID1) may be mapped onto a primary user identification record retrieved via interaction with an identity record management system (not shown). In cases where the extracted source identifier corresponds to a device identifier uniquely associated with the user (e.g., a card-unique identifier pUID retrieved from a contactless card associated with the user) the switchboard may validate and tokenize the extracted identifier, for example, via interaction with an issuing entity and further map the validated and tokenized device identifier onto a primary user identification record via interaction with an identity record management system operating as part of and/or communicatively coupled to the distributed switchboard system 202. Subsequently, when a client application initiates an access to a FIDO-authenticated resource, the source identifier (e.g., UID1) provided from a client device is used to locate the FIDO identity token associated with the client (e.g., user 206) or the service-requesting party. A FIDO message may then be constructed based on the FIDO Identity token—The FIDO message may comprise the FIDO challenge received from the FIDO RP site. The FIDO message may then be signed by a FIDO private key of the FIDO security key pair, and sent, along with the client identifier to the FIDO RP site. In some embodiments the issuing or validator entity and/or the identity record management process and/or module may be managed by and/or accessed via the switchboard system.

FIG. 2A illustrated an example corresponding to management of FIDO services, on behalf of one or more serve-requesting entities, as initiated by an initial FIDO registration request received from a user (e.g., from a user browser application executing on a user device). In some embodiments, FIDO registration process may be fully automated by the switchboard such that no communication with a user device may be required. This exemplary implementation in illustrated in FIG. 2B.

In some embodiment, the distributed switchboard may register one or more of service-requesting entities (e.g., client applications reliant on FIDO-authenticated service and/or a user access initiated via web browser running on a user device) automatically with no user interactions.

Figure 2B:
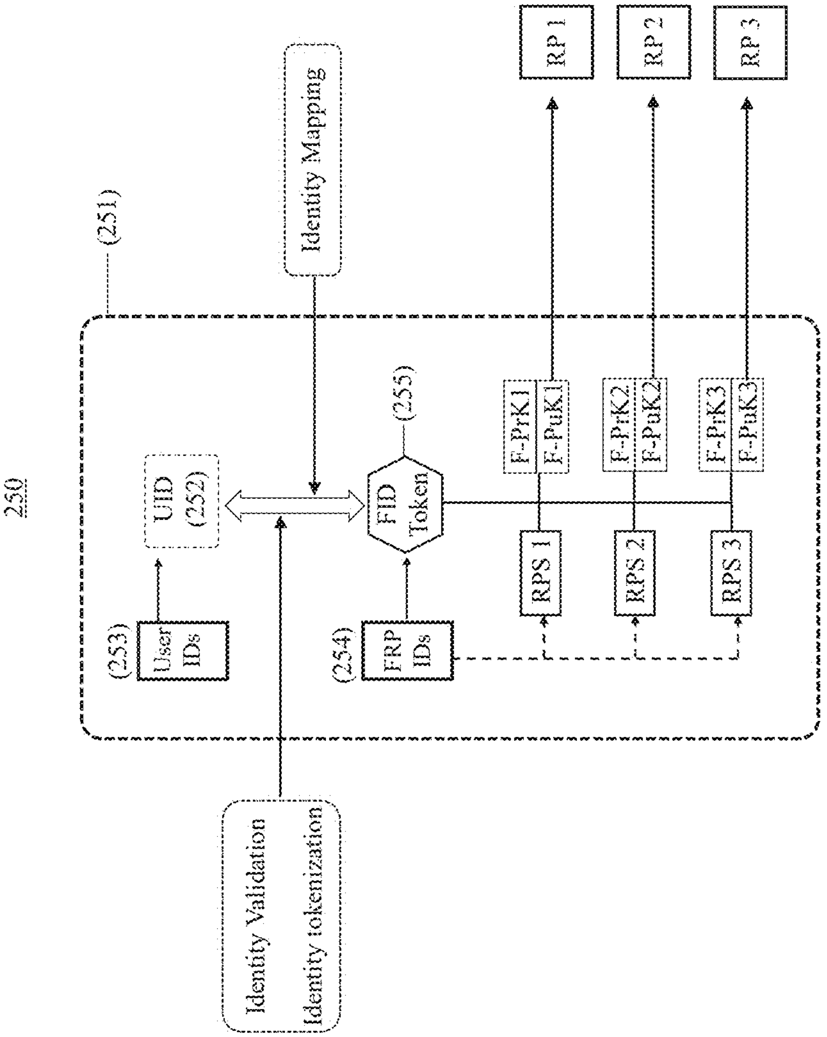
FIG. 2B illustrates an exemplary process for automated FIDO registration based on Identity token without interactions with a user or a FIDO service-requesting party, in accordance with example embodiments.

With reference to FIG. 2B, FIDO site identifiers for various FIDO-reliant sites and/or services may be obtained from a listing of FIDO RP (FRP) site identification records 254. The FRP site identification records 254 may be provided by a user and/or compiled by the switchboard system 251 based on data retrieval processes and/or a set of system-generated data retrieval instructions. The switchboard 251 may then auto-register a FIDO account, on behalf of one or more client entities identified by a listing of client identification records 253. In some embodiments, client and/or SRE identification records 253 may be maintained by the switchboard and/or externally accessed therefrom. Referring back to the operation of the exemplary switchboard implementation 251, a client and/or SRE represented by the UID 252 may be registered, on a basis of a generated FID token 255, with a number of FIDO relying sites (e.g., RP1-RP3). Site-specific FIDO security key pairs may then be generated for each FIDO RP site.

Referring back to the exemplary embodiment 250 in FIG. 2B, a client and/or SRE identifier (e.g., UID 525) may be retrieved from a list of client and/or user identification records 253 maintained and/or stored by the switchboard (SB) system 251. In some embodiment, the user identifier 252 may be retrieved from a user database communicatively coupled with the distributed switchboard 251 or alternatively retrieved by the distributed switchboard (SB) 251 from a client device associated with the (service-requesting) user. In either case, the user identification record 252 may be registered, on a basis of a generated FID token 255, with a number of FIDO relying sites (e.g., RP1-RP3). The corresponding site-specific FIDO security key pairs (each comprising a FIDO private key corresponding respectively to F-Prk1-F-Prk3 and a FIDO public keys corresponding respectively to F-Puk1-F-Puk3) is then generated and maintained by the switchboard 251. In some embodiments, the FIDO private key may be stored and maintained by the switchboard 251 and the FIDO public key may be transmitted, along with a user identifier (e.g., UID 252 or a primary client identifier mapped thereto), to the target FIDO RP. In accordance with another embodiment applicable to both cases described above, the generated site-specific FIDO keys may be transmitted back to a client authenticator device, and utilized therefrom, for example, to initiate a FIDO authentication request directly with a corresponding FIDO RP site.

Accordingly, as described with respect to some aspect of the disclosure, the FIDO registration process may be triggered and facilitated by the distributed switchboard system (e.g., SB 251) based on a user request message (e.g., as illustrated in FIG. 2A). In other embodiment, as further described with respect example 250 in FIG. 2B, the FIDO registration process may be automated based on automatic retrieval of user identification records, collected from a plurality of user by one or more switchboard data services, and archived by the switchboard system 251.

As described with reference to example 100 of FIG. 1, identity validation and tokenization may be carried out by the switchboard via interaction with a validator entity such as the issuer 108, in order to establish a validated and/or authenticated identity token (FID token) for a service-requesting entity (SRE) managed by the switchboard. The FID token, which incorporated a proof of validity, for the SRE, may then be used, by the switchboard, for interacting with secure systems and/or processes to compute and/or derive FIDO credentials and security key pairs for a plurality of FIDO-reliant sites and/or services (e.g., FIDO RPs). In accordance with some embodiments of disclosure, the resolution of an SRE identity and generation of FIDO credentials for a specific FIDO site and/or service may occur together with the signing and validation of a FIDO challenge exchange between a distributed switchboard application and one or more FIDO RPs. Accordingly, aspect of the disclosure are directed to FIDO access provisions in response to a FIDO access request from a previously unregistered user.

Figure 2C:
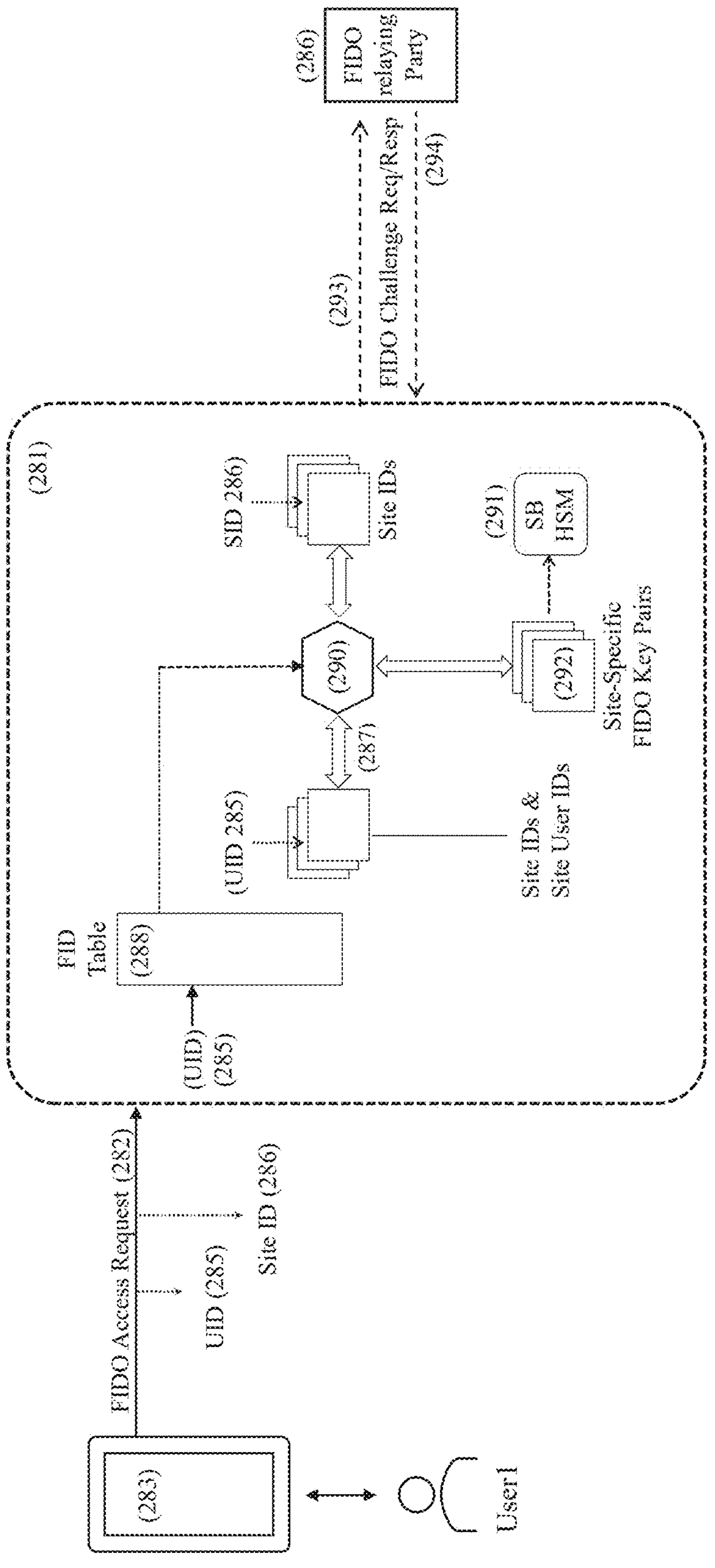
FIG. 2C illustrates an aspect of the subject matter in accordance with example embodiments.

For example, with reference to exemplary representation 280 in FIG. 2C, a FIDO access request 282 (e.g., a FIDO authentication request), comprising a UID 285 and a Site ID 286, may be received from one or more service-requesting entities (e.g., User1 transmitting a FIDO authentication and/or access request 282 for a specific FIDO website and/or service identified by site identifier 286, via a mobile web browser executing on the user device 283.) If the user and/or SRE associated with UID 285 has been auto-registered with the requested FIDO relying site, identified by Site ID 286, the UID 285 may be used as an index to retrieve a corresponding FIDO identification (FID) token (e.g., FID token 290) from a FID table 288 that may be maintained by the switchboard system 281. If the site ID 286, extracted from the FIDO access request message 282, correspond to a FIDO relying party for which the user is auto-registered (e.g., Site ID 286 corresponds to an entry in the RP identifier table 254 illustrated in FIG. 2B), site-specific FIDO security keys for the target FIDO relying site may be accessed from the FIDO key records 292 maintained by the switchboard 281. In the above described embodiment of automated and/or dynamic FIDO authentication, user identification data (e.g., UID 285) may have been previously registered, by the switchboard 281, with the requested FIDO relying site 286. Accordingly, when a FIDO access request is issued, the UID 285, extracted form a FIDO access and/or authentication request 282, may be used as an identity lookup index with FID table 288, to identify and return a corresponding FID token 290 associated with UID 285. Based on the FIDO identity token 290, a FIDO security key pair may then be retrieved and/or generated for the FIDO relaying site 286. The FIDO challenge 294 retrieved from a FIDO relaying site (e.g., FIDO RP), may then be signed using the private key of the security key pair for the previously registered FIDO relaying site and/or service (e.g., FIDO RP 286).

In some embodiments, FIDO key records 292 may be provided by a Hardware security module 291 associated with and/or managed by the switchboard system 281. Subsequently, a FIDO challenge 294 (e.g., received in response to FIDO challenge request message 293 transmitted to a corresponding RP server (as identified in the FIDO access request message 282) may be signed with the site-specific FIDO private key (e.g., FIDO private key diversified based on the RP site identifier 286). The signed FIDO challenge along with a client identifier (e.g., UID and/or a client identification record mapped thereon) may then be returned to the target FIDO RP for validation with a corresponding FIDO public key. Accordingly, if a user identification record (e.g., UID 252), received from an SRE in connection with a FIDO service request, has been registered with the requested FIDO relying site, a client FIDO security key pair may be retrieved based on the mapping of the UID with an existing FIDO identity token (e.g., FID token 255). In some embodiments, the corresponding public key may be transmitted to the target FIDO RP 286 during the registration phase.

However, with reference to exemplary representation 280 in FIG. 2C, if the user and/or SRE associated with UID 285 has not been previously registered with the requested FIDO relying site (e.g., an identification record UID and/or pUID of the service-requesting entity included in the FIDO access request 282 does not correspond to an entry in the FID table 288 illustrated in FIG. 2C), the user identity may be resolved in real-time during the FIDO authentication phase (e.g., dynamically in response to receiving a FIDO access request 282). The user identity may be resolved based on the exemplary process illustrated in FIG. 1, whereby identity validation tokenization and mapping may be carried out by the switchboard via interaction with a validator entity such as the issuer 108, and an identity record management server and/or database, in order to establish a FID token for the service-requesting entity. In some embodiments, the SRE may be managed by the switchboard.

Referring back to example 280 of FIG. 2C, a FIDO challenge request based on the validated and personalized FIDO identity token, is then sent to the RP site and a response message including the FIDO challenge and/or a site identifier associated with the RP is sent back and retrieved by the switchboard. The challenge is signed by the site-specific private key and the signed challenge, along with a client identifier, is sent back to the FIDO RP 286. In accordance with the described implementation, no registration action on part of a client (e.g., user 1) is requires. In fact, no registration with a FIDO RP site is required as the identity is resolved during the authentication process in a step contemporaneous or consecutive with the generation of the site-specific FIDO security keys. In accordance with the described embodiment associated with exemplary operation of the switchboard 281, the only communication received by the FIDO RP site 286 may correspond to the transmission of the site-specific FIDO public key that may be passed on, along with the signed FIDO challenge, to the RP server during the FIDO authentication phase (e.g., in real-time upon receipt of the FIDO access request 282). Alternatively, the FIDO public key may be transmitted to the FIDO RP during the FIDO challenge request and/or response communication between the switchboard and the FIDO RP.

In some embodiments, the site ID 286 may be returned from FIDO RP site along with a FIDO Challenge 294. In this case, the FIDO security keys may be generated and/or diversified based on the site identifier returned by the target RP site.

In accordance with some embodiments, The FIDO security key pair may be diversified using, for example, a site identifier of a target RP, during the auto-registration process (e.g., FIG. 2B) or the user-initiated registration process (e.g., FIG. 2A), prior to being stored and mapped in the memory of the switchboard. In other embodiments, site-specific diversification of a FIDO security key pair may occur during a FIDO authentication phase using a site identifier received from a FIDO reliant party along with a FIDO challenge to be signed and/or encrypted. In both scenarios, the diversified FIDO public key may be sent back to the RP site, either during the auto-registration process, as in the former, or along with the signed FIDO challenge during the FIDO authentication phase, as in the latter.

Figure 3A:
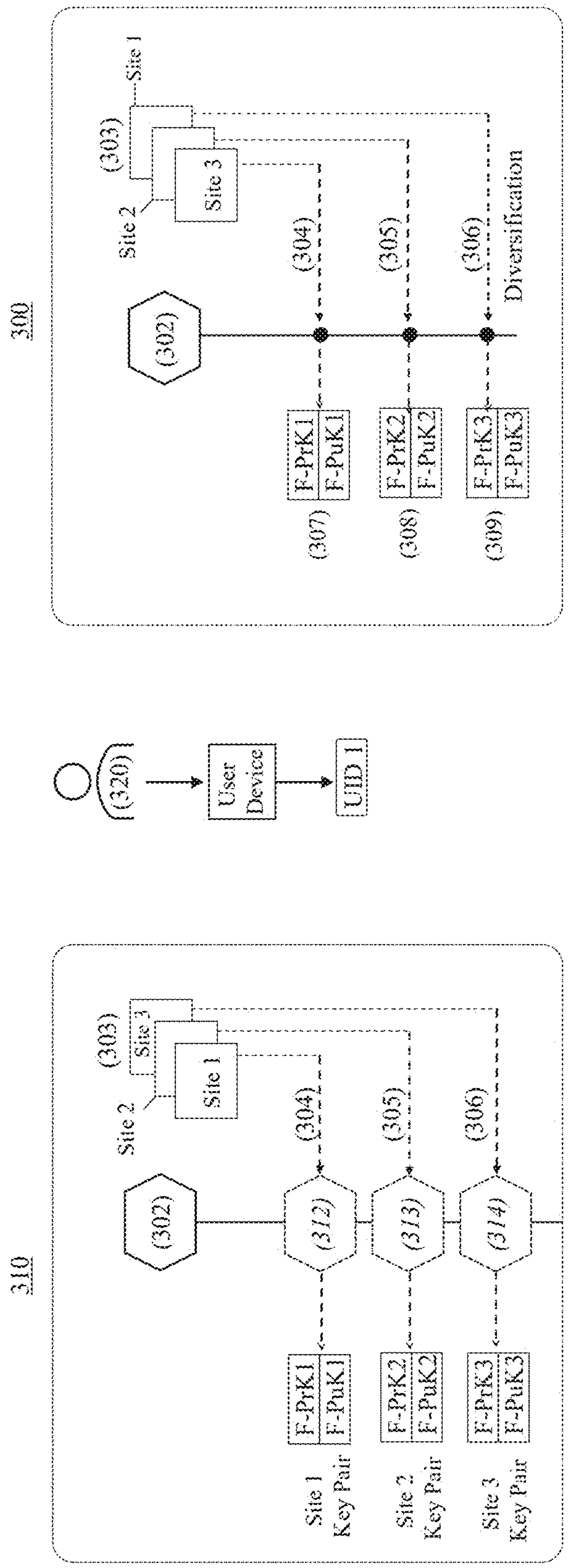
FIG. 3A illustrates an exemplary implementations of direct and virtual mapping of site-specific user identification data to a pre-validated and personalized identity token, in a cloud-based FIDO authenticator, in accordance with example embodiments.

FIG. 3A illustrates an exemplary implementations of direct mapping (as shown by exemplary mapping implementation 300) and virtual mapping (as shown by exemplary mapping implementation 310) of site-specific user identification records onto a generated FID token 302, in a cloud-based FIDO authenticator.

As described in the foregoing, identity verification and tokenization process may involve the transmission of verification request (e.g., for UID 1 associated with a user 320 with reference to FIG. 3A) and retrieval of the validation response (e.g., including a validation token) from a corresponding issuing and/or validation entity. The generation of a FIDO Identity (FID) token maybe a result of acquisition and mapping of a validator-signed validation token to a client identifier uniquely identifying a client and/or a service-requesting entity. The resulting FID (identity) token may then be used for authorized and/or authenticated generation of FIDO security key pairs for various FIDO relying sites. This is illustrated by the exemplary representation 300 in FIG. 3A. In the mapping example 300, the FIDO identity (FID) token 302 is used as proof of authenticity for establishing FIDO-related communication with FIDO relying parties (e.g., Sites 1-3) identified, for example, from identification records 303 storing FIDO relying site and/or service identifier data 304, 305, 306 associated respectively with Sites 1-3). Site-specific FIDO security key pairs 307, 308, 309 (each comprising a FIDO Private key (F-PrK) and a FIDO public key (F-PuK)) are then generated for the service-requesting party (e.g., user 320 associated with a user identifier UID 1). Each key pair 307-309 may be customized and/or diversified for a specific FIDO relying party (e.g., Sites 1-3) using the respective site identifiers 304-306. The respective site identifiers may be retrieved, for example, from FIDO site-identification records 303. In example 300, the site-specific FIDO security key pairs 307-309, generated based on FIDO site identifier 304-306, for the service-requesting user 320, may be directly mapped to the FIDO identity token 302 which represents a single pre-validated and personalized identity token, which uniquely and anonymously identifies the user 320.

As described above, with respect to example 300, the pre-validated and personalized identity record, used in establishing proxy FIDO services with FIDO relying sites, may be represented by the FID token 302 (e.g., validated by an issuing party and personalized with a specific client identification record). However, in some embodiment, as illustrated by example 310 in FIG. 3A, the FID token 302, may be mapped to a virtual identity token derived and/or computed from the FID token 302 for each FIDO relying sites.

Referring to example 310 in FIG. 3A, virtual SRE and/or client identity tokens 312-314 maybe derived and/or computed from the FID token 302 and uniquely associated (e.g., diversified) for each FIDO relying site and/or service accessed and/or requested by user 320 (e.g., FIDO relying Site 1-3). The site-specific diversification of the FIDO identity token 302 may be based on specific site identifier associated with each FIDO relying site and/or service.

Accordingly, each pair of FIDO security keys, for a specific FIDO-reliant service (e.g., Site 1-3) may be mapped to a unique site-specific virtual client identification token derived and/or computed from the FIDO identity token 302 associated with service-requesting entity (e.g., user 320). The virtual client identifiers may be stored and maintained by the switchboard and provided to a FIDO relying party during the registration phase. In some embodiments site-specific virtual client identifiers may be derived, from the FID identity token 302, based on site-specific diversification of the FIDO identity token 302 with a corresponding site identifier. In some embodiments the FIDO security keys may be encoded with the site-specific virtual client identifiers, uniquely associated with distinct FIDO relying site, to generate the site-specific FIDO security key pair. In some embodiments site-specific FIDO security keys may be generated by encoding the FIDO security key with a site identifier of the target RP site and the virtual client identifier uniquely associated with a user and/or client account on the target RP site. In accordance with one aspect of the disclosure, derivation and/or computation of virtual (FIDO site and/or service specific) identity tokens, as described with reference to example 310, enables virtual client identifiers, managed by the switchboard system and derivable from the signed and personalized identity token (e.g., FID token 302), to be associated with various FIDO RP sites and/or services.

As described above, with reference to exemplary implementation 310 illustrated in FIG. 3A, a plurality of virtual client and/or user identity tokens generated based on the FID identity token may be distinctly computed for each FIDO relying site and/or service. A FIDO service registration operation may then be performed based on virtual client identity tokens 312, 313, 314 personalized for FIDO relying sites 1-3 based on diversification with corresponding FIDO RP site identifier 304, 305 and 306, respectively. The Switchboard then acts as authenticator with the target FIDO relying sites on behalf of the virtual SREs represented by virtual identity token (e.g., 312, 313 ad 314). In this scenario user and/or SRE identifiers could be different for each scope.

In accordance with some embayment, the initial user and/or SRE identification record (e.g., UID 1) for generation of the FIDO identity token may be extracted from a FIDO registration and/or authentication request message initiated from a user device, as illustrated in FIGS. 2A and 2C. In some embodiments, as illustrated in FIG. 2B, UID 1 may be retrieved by the switchboard system from an internal (e.g., user ID table 253) and/or external data repository communicatively coupled and/or managed by the switchboard system.

As indicated in the forgoing descriptions, an FID token may be generated by the switchboard system, from a user-related identification data (e.g., UID 1), via interactions with a issuing and/or validating entity and a user identity record management system. The FID token may then be used for secure generation of FIDO credentials as shown in FIGS. 2A-2C.

Figure 3B:
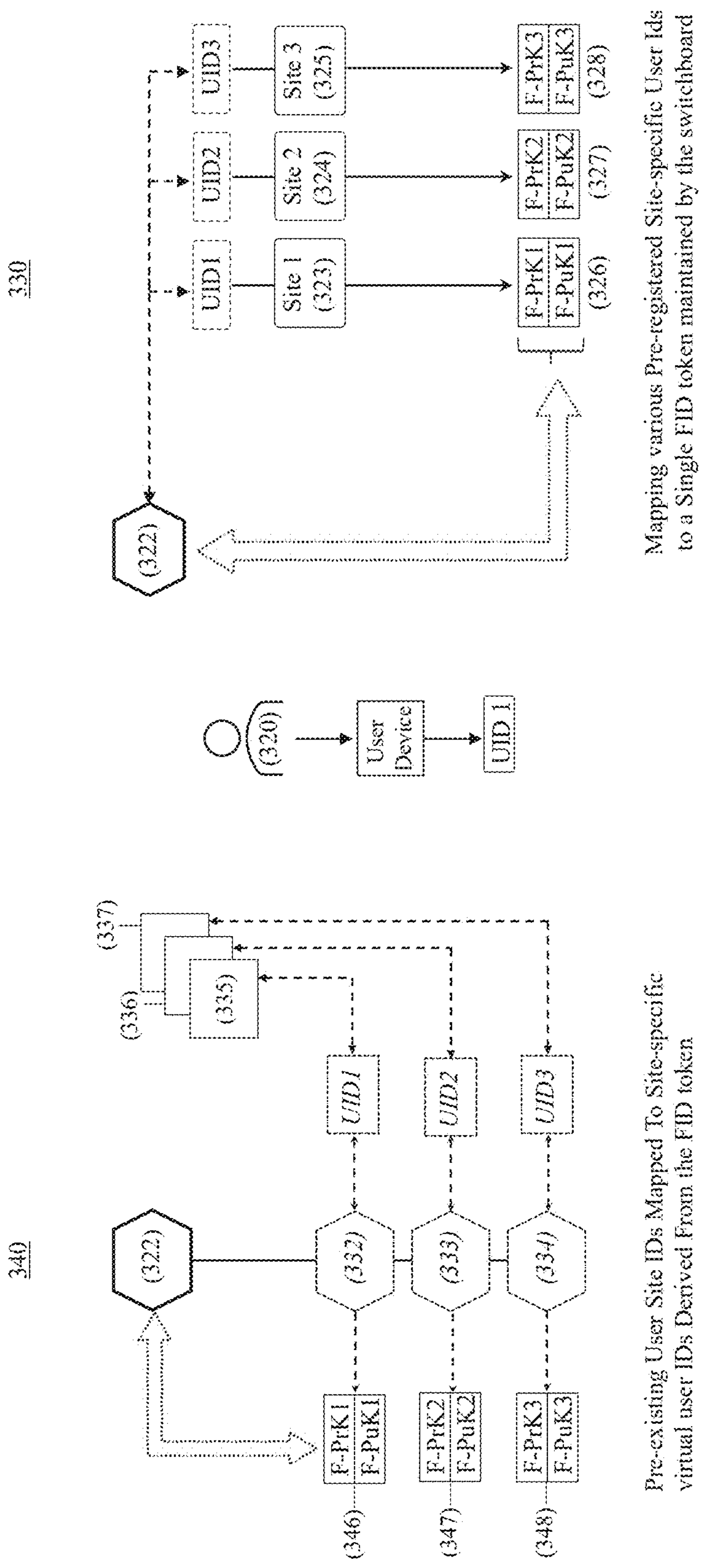
FIG. 3B illustrate an exemplary implementation for consolidation of existing or previously registered site-specific user identification and FIDO credential records with various FIDO RPs based on direct and virtual mapping onto a signed and personalized identity token maintained by a cloud-based FIDO authenticator, in accordance with example embodiments.

FIG. 3B illustrate an exemplary implementation for consolidation of existing and/or previously registered FIDO identification records associated with various FIDO RPs. In accordance with some embodiments, the consolidation of pre-existing FIDO user identifiers may be based on direct or virtual mapping of various site-specific user identity records onto the generated FID token (e.g., as shown respectively by exemplary representations 330 and 330). In some embodiments, consolidation by direct mapping, as shown in representation 330 involves mapping of pre-existing site-specific user identifiers (e.g., UID 1-UID3), respectively associated with FIDO relaying site 323-325 directly onto the FID token 322, thereby mapping various (pre-registered) site-specific user identifiers to a single FID token derived and maintained by the switchboard system. Specific Site identifiers (e.g., Site 1-Site 3) associated with each RP 323-325 may then be used to generate site-specific FIDO security key pairs 326-328, respectively associated with Site 1 and/or UID 1, Site2 and/or UID2 and Site3 and/or UID3.

FIG. 3B illustrates an exemplary mapping implementation 330 for consolidation of pre-registered user FIDO identification data (e.g., pre-registered user FIDO identifiers associated with various FIDO relying sites and/or services) based on the FIDO identity token 322. This embodiment is relevant to consolidation of pre-existing FIDO credentials and identities onto a managed FIDO authenticator system, based on a distributed switchboard implementation as described above.). Accordingly, the switchboard implementation may be configured, in addition to proxy facilitation of FIDO-related services (e.g. FIDO registration and/or authentication requests), for consolidation of pre-existing FIDO identification records and credentials such as pre-registered or previously-used identifiers at one or more FIDO-enabled sites and/or services. The consolidation may involve mapping of the user identifiers, retrieved from various sources, to an FID token generated for the user (e.g., FID token 322). Referring back to FIG. 3B, the exemplary mapping implementation 330 illustrates FIDO consolidation of previously registered user identification data UID 1-3 associated with distinct FIDO relying sites and/or services 323, 324, 325, by direct mapping onto FID token 322. Management of FIDO access operations, for the aforementioned FIDO sites, may than be ported over to the switchboard system by re-generation of new or porting of pre-existing (Site-specific) FIDO security key pairs 326, 327, 328, associated respectively with FIDO sites and/or services 323-325.

With reference to the exemplary mapping implementation 330, descried above, consolidation of a plurality of distinct user identifiers (E.g., UID 1-UID 3) associated with various FIDO-reliant services and/or FIDO relying sites (e.g., Site 1-Site 3) is based on a providing a mapping between existing or previously registered user FIDO credentials and the FID identity token 322 generated and maintained by the switchboard system.

In some embodiments, consolidation of pre-existing FIDO user identifiers may be implemented by virtual mapping of various site-specific user identity records onto the generated FID token, as illustrated by exemplary mapping implementation 340. Consolidation of various existing site-specific FIDO user identifier by virtual mapping under FID token 322 may involve derivation and/or computation of various distinct virtual identity tokens from the FID token 322. Then each pre-existing site-specific user identifier (UID 1-UID 3) associated respectively with a FIDO relaying site (335-337), may be mapped onto a distinct virtual identity tokens (e.g., 332-334) that are computed and/or derived from the FID token 322. Various user FIDO identifiers, registered with distinct FIDO relying site and/or services, may then be mapped to specific virtual client identity tokens, by diversifying a corresponding virtual identity token, derived from the FIDO token 322, by the specific site identifier of the FIDO relying site. For example, with reference to implementation 340 virtual client identifiers 332, 333 and 334 are generated, from the FID token, for user identifiers UID1, UID2, UID3 based on a diversification process using site identifier 335, 336 and 337, respectively.

With respect to the exemplary mapping implementation 340, consolidation of site-specific user identifier information (e.g., UID1, UID2, UID3) associated with distinct FIDO-reliant services and/or FIDO relying sites 335, 336, and 337, is facilitated by generating a mapping between the previously existing user FIDO identifiers (e.g., UID1, UID2, UID3) and virtual client identifier token (e.g., 332, 333, and 334) derived from the FID identity token 322, and diversified using the site identifier of the corresponding FIDO relying sites and/or services. In some embodiments, The generated virtual client identifiers are stored and managed by the switchboard system.

Referring back to FIG. 3B, management of FIDO access operations, for the aforementioned FIDO relying sites, may than be ported over to a switchboard system by re-generation of new or porting of pre-existing (Site-specific) FIDO security key pairs 346, 347, 348, for virtual client identifiers 332, 333 and 334, associated respectively with FIDO sites and/or services 335, 336 and 337.

In some embodiments of the present disclosure, the service-requesting entities may correspond to one or more distributed components of a federated application wherein the one or more components are reliant on FIDO-authenticated services. In such an example, the federated application (that may or may not be associated with a distributed deployment) may be managed by a distributed switchboard system (e.g., shared between FIDO service requesting and FIDO service providing entities). Alternatively, but not exclusively, the federated application may be implemented as a switchboard application. Accordingly, some embodiments of the present disclosure are directed to a switchboard implementation for building a federated application with on-demand and/or dynamic FIDO access functionality.

In some embodiments, the SRE may be a switchboard application that uses FIDO-reliant services and/or a switchboard-implemented federated application with distributed components. In some embodiments, one or more SREs may correspond to distributed components of a federated application wherein the one or more application components rely on FIDO authenticated services. Some embodiments are directed to a system and method for implementation of cloud-based FIDO services, using a distributed switchboard system, for a facilitating proxy FIDO services (e.g., registration, authentication and key management) for a plurality of applications and/or multiple components and/or microservices of a distributed application).

As such embodiments of the present disclosure are directed to a switchboard-based implementation of FIDO by proxy, that may be used to build a federated application with seamless access to various FIDO-reliant services. With reference to the aforementioned implementation, the various service-requesting entities (e.g., application component with FIDO-service access requirements) authenticate to the cloud-based switchboard system. Accordingly, distinct application components may independently initiate and complete FIDO-related operations via the switchboard. The described configuration provides for a seamless cloud-based management of FIDO-related services and/or operations in the context of a federated application using a distributed switchboard system.

In the described cloud-based switchboard system for facilitating proxy FIDO services and recovery management, FIDO authentication operations may be performed between the SREs and the switchboard system, and between the switchboard system and the FIDO relying parties. Accordingly various components of a distributed application, or other FIDO SREs, may perform their own FIDO authentications via the switchboard (e.g., based on a corresponding FIDO identity token mapped thereto which inherently constitute a proof of validity). With respect to the foregoing embodiments, operations of the switchboard may not be transparent to the FIDO relying parties and/or the FIDO service requesting parties.

One enabling factor underlying the operations of the above described system and/or process is that federated applications associated with distributed components that are reliant upon distinct FIDO services, can authenticate to a common pre-validated identity uniquely associated with the user. Accordingly, the described switchboard-based implementation of FIDO by proxy, in some embodiments, may be used to provide federated FIDO service functionality (e.g., a managed FIDO authenticator with data recovery features) to various remotely deployed components of a distributed application.

Figure 4:
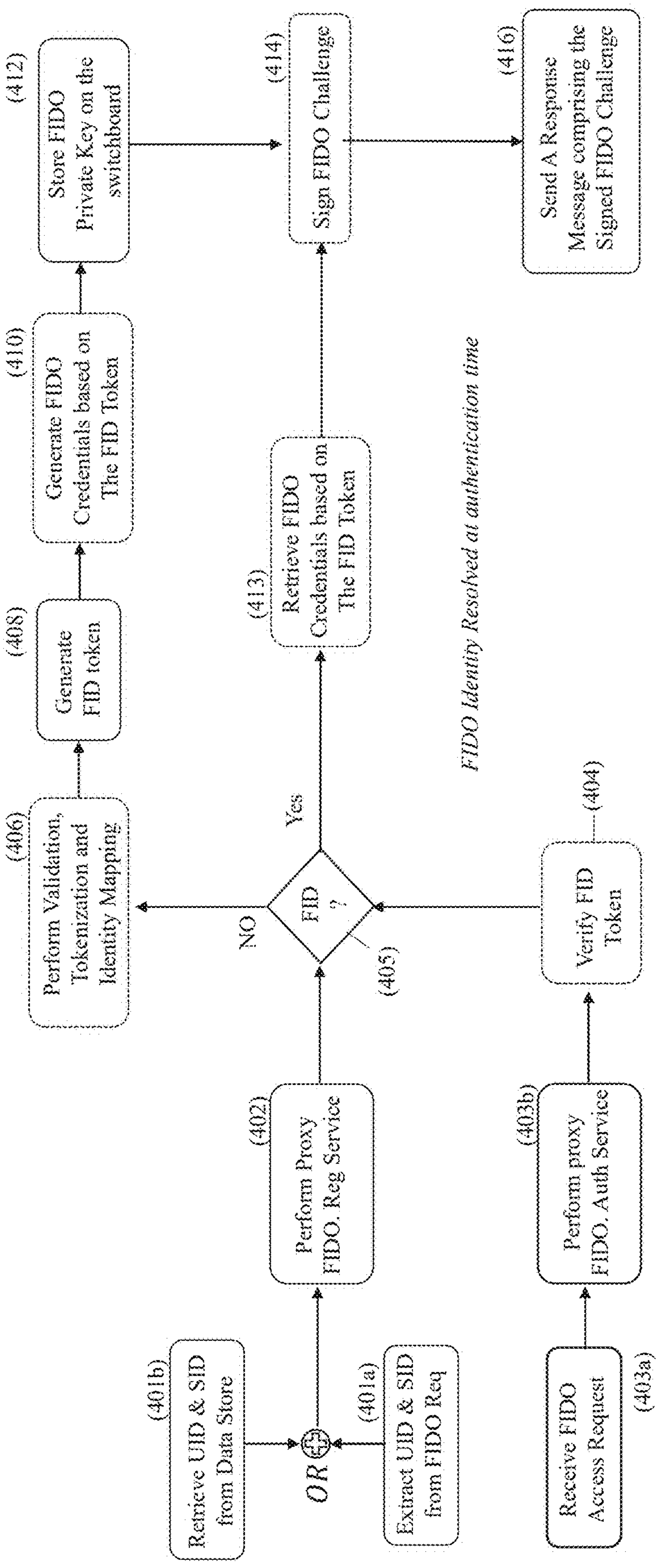
FIG. 4 illustrates an operational flowchart for an exemplary managed FIDO authenticator, in accordance with example embodiments.

FIG. 4 illustrates an exemplary flowchart 400 outlining proxy FIDO implementation with a distributed switchboard system, in accordance with some embodiments of the present disclosure. Initially, at step 402, the distributed switchboard system (shared between FIDO service-requesting and FIDO service-providing parties and/or entities) may initiate a proxy FIDO service, such a FIDO registration service with a target FIDO relying site and/or service. The implementation of the proxy FIDO service may be contingent upon generation of a pre-validated and/or signed and personalized identity token for uniquely and securely identifying the FIDO-service requesting entity. The aforementioned FIDO identity (FID) token may be generated based on an initially obtained identification record. The initially obtained identification data may be associated with a FIDO-service requesting user (e.g., a UID) and/or a device specific to the user and/or SRE (e.g., a pUID uniquely associated with a user contactless card).

The initial user identification data (UID and/or pUID) may be extracted from a FIDO request message (e.g., a FIDO registration request with a target FIDO site and/or service) communicated from a FIDO-service requesting user, at step 401*a*. Accordingly, with respect to step 401*a*, the FIDO registration request may be generated from a mobile browser running on a client device and/or an application requiring FIDO-authenticated service. The FIDO service request received by an exemplary switchboard system at step 401*a* may further comprise an identification record associated with the service-requesting entity and a target site identifier associated with a FIDO relying site. Alternatively, the initial user identification data (UID) may be retrieved by the switchboard from an internal and/or external data repository at step 401*b*. Based on the acquired UID and/or pUID obtained either through step 401*a* or 401*b*, the proxy automation of the FIDO registration service may initiate at step 402. As noted above, proxy FIDO service may be contingent upon generation of a pre-validated and/or signed and personalized identity token for uniquely and securely identifying the FIDO-service requesting entity. At step 405, switchboard system may verify whether the acquired UID and/or pUID is already associated with a signed and personalized identity token (e.g., FID token) stored and/or maintained by the switchboard. If at step 405 an existing FID token for the acquired user identification data is identified and/or located by the switchboard system, a set of FIDO credentials (e.g., a FIDO security key pair) associated with the target FIDO site and/or service (e.g., diversified based on the corresponding site identifier of the target FIDO site identifier) is retrieved and/or computed at step 413. The FIDO challenge is signed with a private key of the site-specific FIDO security key pair at step 414 and a response message comprising the signed FIDO challenge and a client and/or user identifier is transmitted to the target FIDO relying site at step 416.

However, if an FID token is not identified at step 405, exemplary process flow 400 may move to step 406. At step 406 a validation token is generated based on the initial user identification data (UID and/or pUID). In some embodiments the validation token may be generated via interactions with a validation and/or issuing entity managed by and/or communicatively coupled to the switchboard system. The validation token may further be mapped to a primary user identification record maintained by and/or accessible to the switchboard. In some embodiments the identity mapping may be performed via interactions with a identity record management system and/or database managed by and/or communicatively coupled to the switchboard system. At step 408 an FID token is then generated that uniquely and anonymously identifies the service-requesting entity and/or user associated with the UID and/or pUID data.

The signed FIDO identify token may include an inherent authentication signature which may be used as a proof of validity for interacting with other systems, such as a FIDO authenticator process and/or module for deriving set of FIDO keys during a FIDO-reliant data access operation. Accordingly at step 410, FIDO credentials, including a FIDO security key pair comprising a private and a public key, are generated for the requested target FIDO site and/or service. In accordance with some embodiments, the generated FIDO private key may be stored and maintained by the cloud-based switchboard system (Step 412). A FIDO challenge received from a relying party, may then be signed using the private key, at step 414 and a challenge response message comprising the signed FIDO challenge and a user identifier is sent back to relying party, at step 416, for verification and subsequent provisioning of access to a requested FIDO-authenticated service and/or resource.

The forgoing descriptions, with reference to FIG. 4, pertain to an exemplary automated and/or user-initiated FIDO registration operations carried out by proxy via the distributed switchboard. However, as described above with reference to FIG. 2C, some embodiments of the present disclosure are directed to implementation of a dynamic FIDO authentication service wherein source identity and provenance are resolved during the FIDO authentication operation and FIDO security keys are generated dynamically at authentication time. In such embodiments the generated private key may be used to sign a FIDO challenge requested and retrieved from a target FIDO relying site, and the generated FIDO public key may be transmitted to the FIDO relying site along with the signed FIDO challenge, for verification thereof. With reference to exemplary flowchart 400, switchboard operations, for implementing a dynamic FIDO access and/or authentication services, may be responsive to a FIDO access request received by the switchboard at step 403*a*, to initiate performance of proxy FIDO authentication and/or access services as noted in step 403*b*. Following a verification of a FID token for the FIDO access requesting entity, at step 404, a similar sequence of FIDO related operations, involving a combined process of registration and authentication corresponding to steps 405-416, may be dynamically performed by the switchboard (e.g., a switchboard nodes and/or an internal process) as part of the FIDO authentication process.

Figure 5:
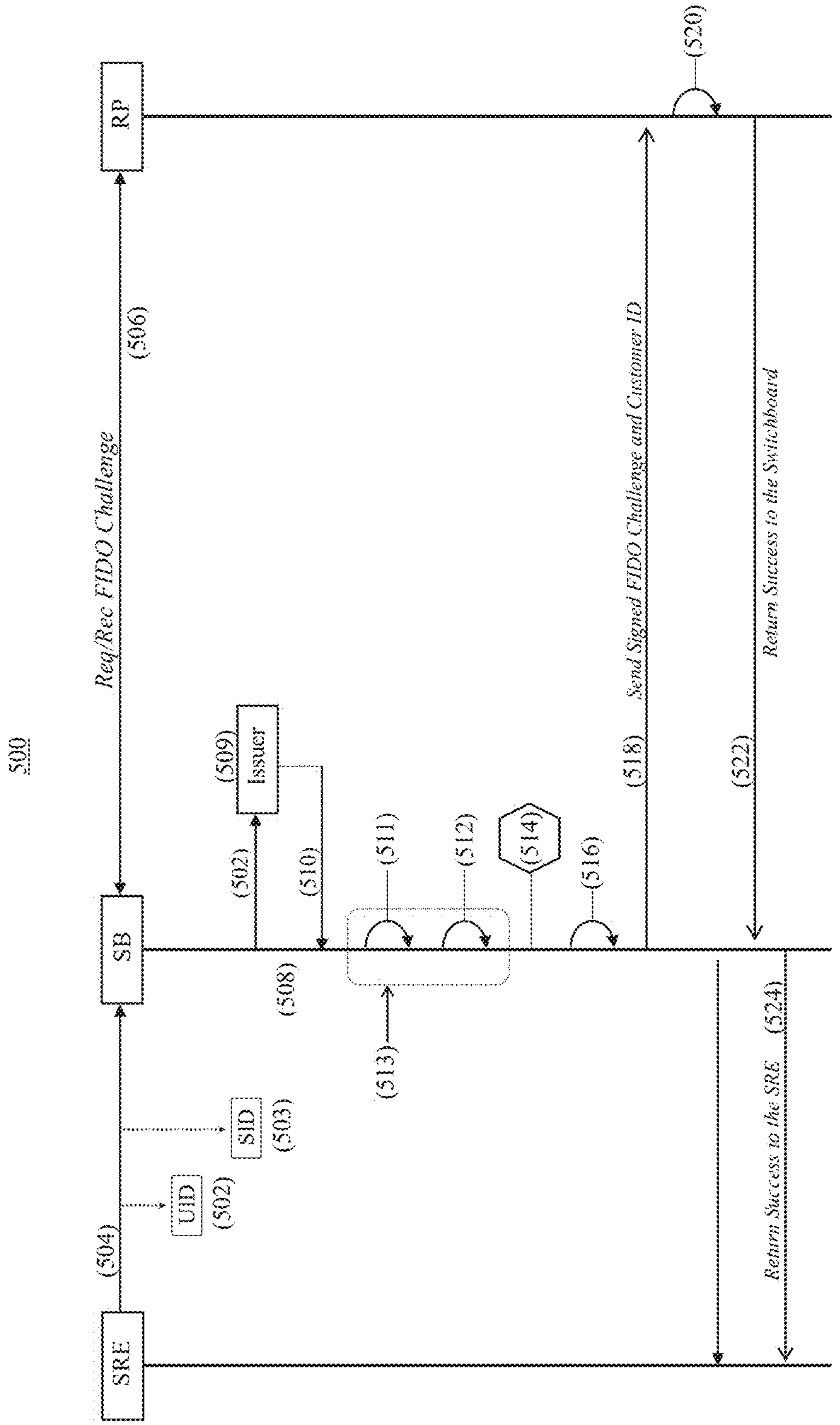
FIG. 5 illustrates a timing sequence diagram for an exemplary managed FIDO authenticator, in accordance with example embodiments.

The timing sequence diagram 500, illustrated in FIG. 5, is associated with an exemplary implementation of managed FIDO services, between a service-requesting entity (SRE) and a FIDO relying party (RP), by proxy facilitation and coordination of a switchboard system (SB) which may be associated with a cloud-based deployment. The exemplary process, represented by the timing sequence 500, may be taken as initiated by a request message 504, associated with FIDO use case, and transmitted by the SRE. The request transmission 504 may be initiated by a browser application running on a user device. The request transmission 504 may also be initiated by a user-associated application and/or an application component with FIDO-reliant service requirements. The request message 504 may correspond to a FIDO registration request or it may represent a FIDO authentication and/or access request. With respect to the former scenario, the described implementation may correspond to managed cloud-based FIDO registration with user requested target FIDO site and/or service, operative to provide on-demand managed FIDO authentication at a later time when requested by the user.

As described in the forgoing, the SRE may correspond to a FIDO-related access initiated, for example, via a browser application executing on a user device. As described above, in some embodiments, the SRE may also correspond to a user application and/or independent application components and/or microservices of a distributed application requiring access to FIDO-reliant services.

Additionally, the FIDO service functionalities provided by the described (distributed) switch-board implementation 500 may be operative to perform dynamic FIDO access authentication from a previously unregistered SRE. For example, the request message 504 may correspond to a FIDO service access request transmitted from an SRE without prior registration. In such a scenario the operation of the switchboard will include resolution of the identity and generation site-specific FIDO security keys during the FIDO access verification (i.e., authentication) phase and/or event. The FIDO access verification and/or authentication event, may further involve the acquisition, signing and communication of a FIDO challenge issued by the RP. The aforementioned embodiment wherein the request message 504 corresponds to a FIDO access and/or authentication request initiated from a unregistered SRE, is further described below with reference to the exemplary timing diagram 500 in FIG. 5.

Following the receipt of the transmission 504, a FIDO challenge request and/or response communication 506 may be initiated, with the FIDO relying party (RP), by the switchboard (SB). For example, a FIDO challenge may be requested and received from the RP. Following the receipt of FIDO challenge, a set of operations (such as those described with respect to FIGS. 1 and 2A) involving generation of a FID token (uniquely representing the SRE) and set of FIDO credentials, based thereon, may be carried out by the SB. Referring back to exemplary timing sequence diagram 500, step 508 involves the generation and/or acquisition of validation token 510, via interaction with a validator and/or issuing entity 509. The identification data 502 received from the SRE and sent to the validator 509 may correspond to an identifier directly associated with the user (e.g., UID) and/or a device-unique identifier (e.g., pUID) retrieved from a device, such as a contactless card, uniquely associated with the user.

Accordingly, at step 508 a validation token 510, signed with a unique key associated with the validator 509, is generated and returned to the SB. In some embodiments, the validator 509 may be an entity associated with and/or managed by a distributed switchboard operations represented by the exemplary timing diagram 500. As described above, the SRE-related identification record included in the FIDO access request transmission 504, may correspond to a unique user device, such as a contactless card, and/or a name and/or number associated with the user identity. Accordingly, in some embodiment the received and extracted identity data (e.g., UID) may be mapped to a standard and/or primary client identifier 513 at the identity mapping step 511. The client identifier 513 may be maintained by and retrieved from an identity record management module and/or process (not shown in FIG. 5). In some embodiments, the identity record management module and/or process may be an entity associated with and/or managed by the distributed switchboard system. At step 512, a signed and personalized FIDO identity (FID) token 514 may be generated, by the switchboard. The FID token 514 may then serve as a pre-validated and/or signed and personalized identity token for uniquely representing the SRE and/or user. In some embodiments, the FID token 514, created at step 512, may be generated based on the client identifier 513, retrieved from an identity record management system (not shown), and the validation token 510, generated by and retrieved from a validator entity (e.g., issuer 509).

In some embodiments, a unique FIDO site and/or service identification and/or identifier data (e.g., SID 503) for a target FIDO service and/or site (e.g., RP), for generation of site-specific FIDO security keys, may be provided along with a user-related identification record 502 (e.g., UID or pUID), in the FIDO request message 504. In other embodiments, a unique site identifier SID may be provided by the RP in the FIDO challenge request and/or response communication 506 between the switchboard SB and the FIDO relying site RP. The RP provided site identifier may be different than the target site identifier SID that may be provided by an SRE via the FIDO request transmission 504. Following the generation of the FID token 514 a FIDO security key pair (comprising of a FIDO private key and a FIDO public key) may be computed for the SRE at step 516. The computation of the FIDO security key pair may involve incorporation of the target FIDO relying site identifier (e.g., SID 503), in order to generate a site-specific FIDO security key pair (e.g., unique to the specific FIDO target site). At step 518, the FIDO challenge received from the RP may then be signed by the FIDO private key and transmitted to the RP along with the client identifier. Upon reception of the transmission 518 (comprising the signed FIDO challenge and the client identifier), the RP may perform a lookup of a corresponding public key based on the received client identifier, and validate the signed FIDO challenge with the corresponding public key, at step 520. Upon successful validation, an authentication and/or access success message may be sent back to the switchboard, at step 522. Subsequently, a FIDO access verification message may be passed back to the SRE (e.g., from the SB) at step 524. The SRE is then granted FIDO-authenticated access to the requested resource hosted and/or administered by the RP.

In the aforementioned exemplary implementation, the identity and provenance of a FIDO service-requesting party is resolved during the FIDO access and/or authentication event. Accordingly, the site-specific FIDO public key may be computed and transmitted to the RP during the communication exchange 506 when a FIDO challenge is retrieved from the RP. The site-specific FIDO public key may also be transmitted to the RP, along with the signed FIDO challenge, during the communication exchange 518.

Example 500 describes an exemplary proxy-implementation of managed FIDO access services wherein identity resolution steps (e.g., steps 508-512) and FIDO credential creation, corresponding to step 516 (which generally occur during a FIDO registration process) are performed together with the FIDO authentication process (e.g., steps 518-524) initiated by the FIDO access request 504. However, in some embodiments, the registration process (whether automated or user-initiated) corresponding to steps (508-516) may occur independently responsive to a received FIDO registration request. In such a scenario, the authentication process corresponding to steps 518-524 may be initiated independently responsive to an on-demand FIDO access request received from an SRE. With respect to the aforementioned embodiment involving managed FIDO registration and authentication process independently initiated (e.g., by an SRE), a FIDO public key (of the site-specific FIDO security key pair), along with a client identifier used in generation of the FIDO token, may be transmitted to the target RP during the FIDO registration process. The FIDO registration process may be initiated by a user (e.g., as shown in FIG. 2A) and/or automatically initiated by the switchboard, as shown in FIG. 2B.

In some embodiments the FIDO credentials (e.g., FIDO key pair), generated in response to request transmission 504, may be transmitted back a user device to be used for accessing one or more corresponding FIDO reliant sites and/or services. In such a case, the user FIDO authenticator device may be associated with improved functionality based on FIDO credential and/or key recovery and management feature provided by the switchboard.

As described with reference to some of the foregoing, the FIDO authentication and/or access operations may be automated by the switchboard on behalf of a user application component requiring a FIDO-reliant service, and/or triggered by a user-initiated browser access to a FIDO-reliant site and/or service. The various embodiments of a managed FIDO authenticator, implemented with a distributed switchboard system, described above, are associated with a FIDO key management and recovery feature which constitute an important performance improvement in the implementation of FIDO and/or FIDO2 protocols and integration of the same into secure electronic communication and data access systems and processes operating across unsecured and/or public networks.

Figure 6:
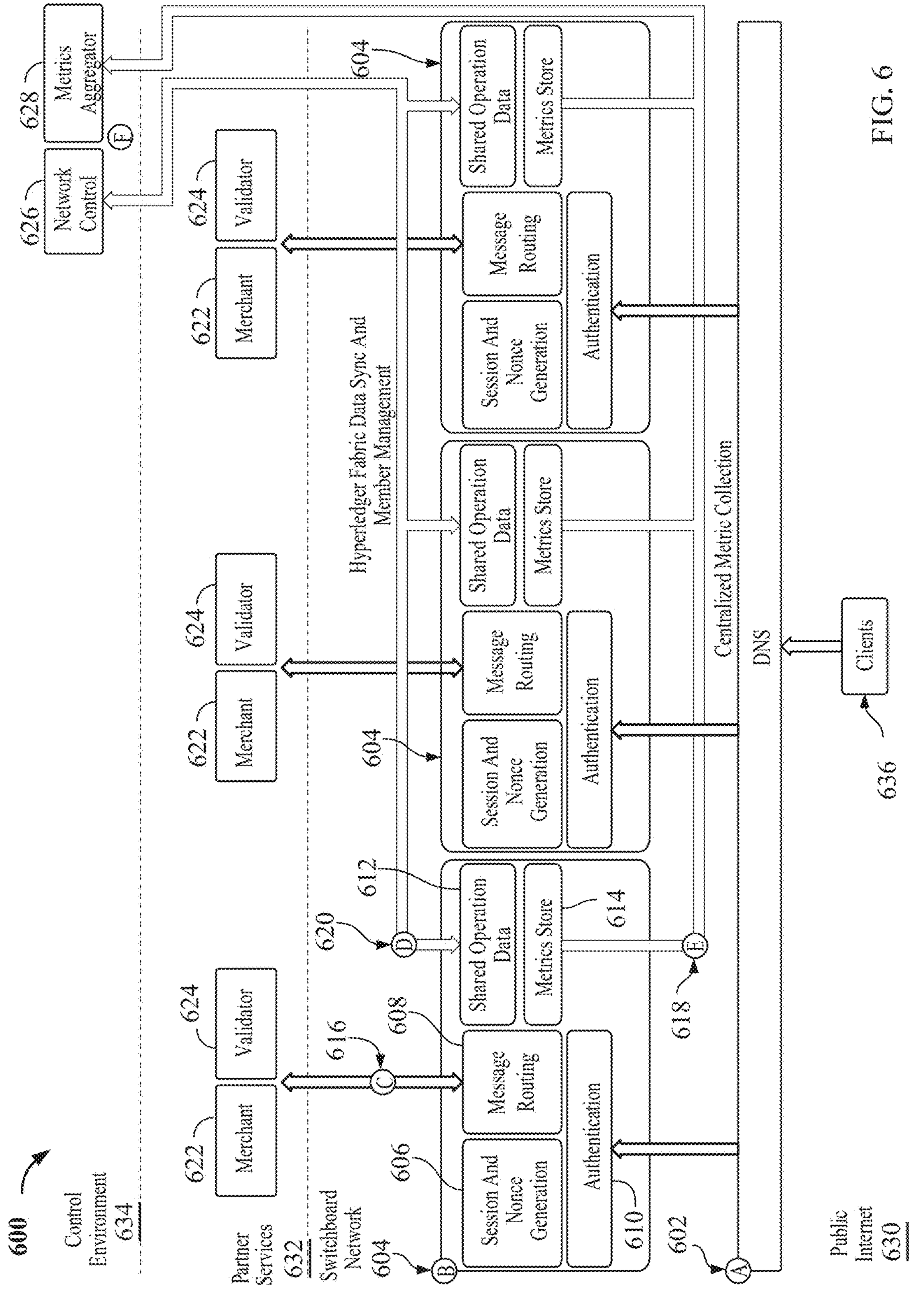
FIG. 6 illustrates an exemplary switchboard system implementation, in accordance with example embodiments.

FIG. 6 illustrates an example of a switchboard-based system 600 in accordance with the embodiments discussed herein. The system 600 includes additional devices and systems configured to enable identity validation and FIDO-related services to one or more SREs and/or client entities 636. Specifically, system 600 enables any number of issuer systems to provide identity validation services to their clients through a switching fabric, i.e., the switchboard system in a secure and safe manner.

In embodiments, the switchboard system includes one or more nodes 604 configured to perform routing operations. Each switchboard node 604 may include a session and nonce generator 606, a message router 608, a 610, an operation data 612 store, and a metrics store 614. Further, each of the nodes may be configured the same and share configurations, but each switchboard node 604 may independently process and route messages and requests to the appropriate systems, such as the FIDO RP systems and issuer systems. Each of the nodes 604 is configured to act as a broker of trust between an issuer system, the FIDO relying party (RP) system 622, and/or validation system 624, for example. Each switchboard node 604 is configured to route each message to the correct issuer system while maintaining data security. For example, a switchboard node 604 may route a message between an issuer system and FIDO RP system while the node is not able to gain access to the private data in the message.

The switchboard system may be configured as a server system including a collection of hardware, software, and networking components that work together to provide services to the clients. Hardware components may include one or more server computers, storage devices, and network adapters. The server computers are configured to run server applications, such as those executable on each of the nodes 604. In some instances, each of the server computers may be configured to operate one or more nodes, e.g., in a virtual environment. The storage devices are configured to store data that is accessed by the applications, and the network adapters are used to connect the server computer to the network.

Each of the server computers may be configured to execute software, including the operating system, the applications, and security software. The networking components of a server system include the network switch, router, and firewall. The network switch is used to connect the server computers to other devices on the network. The router is used to route traffic between different networks. The firewall is used to protect the server system from unauthorized access and attacks.

In some embodiments, the nodes 604 may operate in a cloud-based computing environment, e.g., a collection of hardware, software, and networking components that enable the delivery of cloud computing services. The switchboard nodes 604 and the computing services are delivered over the Internet, and they can be accessed from anywhere in the world with an Internet connection. In embodiments, a client 636 may access a switchboard node 604 through Domain Name System 602 or domain name system (DNS). The DNS 602 a hierarchical and distributed naming system for computers, services, and other resources connected to the Internet or other networks. It associates various information with domain names assigned to each registered participant. In one example, the DNS 602 may translate a name known to software executing on a client 636 to route data to one or more of switchboard node 604 of the switchboard system. In embodiments, the DNS 602 may generate into a number, such as an Internet Protocol (IP) address, an address record (A-record), or another Host name (C-name record). At a high level, the Domain Name System 602 translates known domain names to numerical Internet Protocol (IP) addresses needed for locating and identifying computer services and devices with the underlying network protocols.

In embodiments, a client 636 communicates with the switchboard system to perform one or more of the partner services 632, such as conducting a FIDO transaction (e.g., a FIDO registration and/or authentication request) with a FIDO RP, validate the customer. Once the client 636 identifies a switchboard node 604 and resolves an address to communicate with the switchboard node 604, the client 636 may send one or more messages to the switchboard node 604 to authenticate and perform one- or more FIDO-related operation. The switchboard node 604 includes an authentication 610 function that is configured to authenticate the client 636. In embodiments, the client 636 sends a message or authorization request to the switchboard node 604 with the following header set.

The switchboard node 604 may authorize or authenticate the client 636 or user, and the switchboard node 604 may utilize the additional components, such as the session and nonce generator 206 and message router 208, to perform the operations related to FIDO registration and/or authentication of the client with one or more target FIDO RP systems. Note the clients 636 never interact with the FIDO RP systems, nor vice versa. The nodes 204 brokers all communication.

In embodiments, the switchboard system may utilize a hyperledger fabric 620 to manage synchronizing the shared operation data 612 and member management across the network. The hyperledger fabric 620 is distributed ledger framework having a permissioned network model that only authorized participants can join the network and access the data that is stored on a ledger.

In embodiments, the hyperledger fabric 620 may be generated by creating one or more set of peers, an ordering service, and a channel. Once the network is created, the system 600 deploys chaincode to the network or nodes 604 permitted to access the fabric. The chaincode is the code that runs on the blockchain and executes the network control 626 and operation data 612 logic code. Once the chaincode is deployed, each of the switchboard nodes 604 is configured to invoke transactions on the blockchain to add data to the blockchain, e.g., the operational data. A switchboard node 604 or another device can query the ledger to retrieve data. The ledger is a distributed database that stores all of the data that has been added to the blockchain.

All nodes 604 keep an independently verifiable log of their actions that can be transmitted to a centralized aggregator to build a picture of overall network usage. At a central level, system 600 can manage network operation data and management and have a centralized view of network use, aggregated and abstracted to the appropriate level.

FIG. 7 illustrates an example of a message 700 that may be communicated by a device associated with an SRE (e.g., a contactless card) to perform the functions discussed herein. One or more of the fields in message 700 may also be utilized to route the message 700 through the switchboard system and perform authentication and/or validation techniques.

In embodiments, the message 700 includes an applet version 702 field, an issuer discretionary indicator 704 field, an Issuer Identifier 706 field, a pKey ID 708 field, a pUID 710 field, a pATC 712 field, a nonce 714 field, and an encrypted cryptogram 716.

In embodiments, the fields may be in plain text or encrypted. For example, the applet version 702 field may include an applet version in plain text. The applet version to indicate which applet version is installed on a contactless card and may be used by the other systems to determine how to process the message 700 when communicated. For example, different Applet versions require different validation logic, e.g., an older message may be routed through the issuer system to perform various operations for validation, while a newer message may be routed through the switchboard system to perform the various operations, including validation.

In embodiments, the message 700 includes an issuer discretionary indicator 704 field that may include issuer data and set at the time of personalization. In addition, the message 700 includes an Issuer Identifier 706 field that may include a unique ID assigned to the entity issuing the card, e.g., the issuer. For example, each issuer may be assigned a unique identifier during an onboarding operation when joining the system. The issuer ID can be used by the switchboard system 1508 to route a message and its contents to the appropriate services that are associated with that particular issuer.

In embodiments, the message 700 includes a pKey ID 708 field. In some instances, the pKey ID 708 field may include data that identifies a set of master keys for a card issuer. The issuer's set of master keys may utilize each cards set of derived master keys or unique derived keys (UDK). Further, each card's own set of master keys (UDKs) may be generated during the personalization of the card. The card's UDKs may be utilized to generate session keys that are used to generate the application cryptogram. The session keys generated by a card may be regenerated by a system, e.g., the validator system, utilizing pKeyID to identify the issuer's masters keys to regenerate session keys by the system to perform a validation.

In embodiments, each contactless card 1502 is given a unique 16-decimal digit identity (pUID) at the time of personalization. Derivation of the card applet's unique keys using the pUID is performed off-card. The resultant Application Keys are injected during the personalization of the card. In embodiments, a card's Application Keys are the same as the card's derived master keys or UDKs. The process for deriving the Application Keys (UDKs) is described in FIG. 18, flow 1800.

The message 700 may include a pUID 710 field, including a card unique identifier assigned to the contactless card at personalization time. The pUID 710 field data may be a combination of alphanumeric characters used to uniquely identify each card and associated with a user.

In embodiments, the message 700 includes a pATC 712 field configured to hold a counter value. The counter value keeps a count of reads (taps) made on the contactless card in a hexadecimal format in one example. Further, a counter value may be used to generate session keys to encrypt at least a portion of a message.

In embodiments, each time a message 700 is created, a new session key is derived and utilized to generate one or more portions of the message 700. Specifically, a session key is used to calculate the cryptographic MAC (Application Cryptogram). The card's applet supports a session key derivation option to generate a unique cryptogram session key ASK.

In embodiments, a portion of the data provided in message 700 is static and set on the card during the personalization of the card and other data is dynamic and may be generated by the card during an operation, e.g., when a read operation is being performed. Note that in some instances, the static information may be updateable, but may require the customer and card to go through a secure update process, which may be controlled by the issuer.

In embodiments, the contactless card 110 (illustrated in FIG. 1) may communicate a message between a device, such as a mobile device 113, during a read operation. For example, in response to the contactless card 110 being tapped onto a surface of the device, e.g., brought within wireless communication range, a read operation may be performed on the contactless card 110, and the contactless card 110 may generate and provide the message to the device. For example, once within range, the contactless card 110 and the device may perform one or more exchanges for the contactless card 602 to send the message to the device.

The wireless communication may be in accordance with a wireless protocol, such as near-field communication (NFC), Bluetooth, WiFi, and the like. In some instances, a message may be communicated between a contactless card 602 and a device via wired means, e.g., via the contact pad, and in accordance with the EMV protocol.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A method for a proxy implementation of Fast Identity Online (FIDO) service, the method comprising:

initiating, by a proxy FIDO service, a FIDO registration operation between a service requesting entity (SRE) and a target FIDO relying party (RP), using a first client identifier associated with the SRE, and a site identifier associated with the target FIDO RP, wherein the FIDO registration operation comprises;

obtaining, by the proxy FIDO service, a validation token by authenticating the first client identifier using a first service associated with a validator entity;

generating, by the proxy FIDO service, a FIDO identity (FID) token uniquely identifying the SRE, wherein the FID token is generated using the first client identifier and the validation token;

deriving, by a secure process associated with the proxy FIDO service, a site-specific FIDO security key pair for the target FIDO RP, the site-specific FIDO security key pair being generated based on the FID token and comprising a site-specific public key and a site-specific private key private key diversified using the site identifier of the target FIDO RP; and storing, by the proxy FIDO service, the site-specific private key, wherein the site-specific private key is mapped to one or more of the FID token, the first client identifier, and the site identifier of the target FIDO RP.

2. The method of claim 1, wherein the proxy FIDO service is implemented with a distributed switchboard application.

3. The method of claim 2, wherein the FIDO registration operation is initiated automatically by the proxy FIDO service, and wherein the first client identifier and the site identifier are retrieved from one of an internal and external data storage associated with the distributed switchboard and used, by the distributed switchboard, for automatically initiating the FIDO registration operation.

4. The method of claim 2, further comprising performing a recovery and re-generation of one or more FIDO security keys by the distributed switchboard, wherein the FID token, stored on the distributed switchboard, comprises a proof of validity signature for recovery and re-generation of FIDO security keys associated with the SRE.

5. The method of claim 1, wherein the FIDO registration operation is initiated in response to a FIDO registration service request received from the SRE, and wherein the first client identifier and the site identifier are extracted from the FIDO registration request.

6. The method of claim 5, wherein the SRE corresponds to a browser application running on a communication device associated with a user, and the FIDO registration request is initiated by the user via the communication device.

7. The method of claim 5, wherein the SRE corresponds to a switchboard application requiring FIDO-reliant service.

8. The method of claim 1, further comprising mapping the first client identifier to a second client identifier retrieved using a second service associated with an identity system of records.

9. The method of claim 8, wherein the FID token, uniquely identifying the SRE, is generated from the second client identifier and the validation token.

10. The method of claim 9, further comprising mapping the site-specific private key to the second client identifier.

11. The method of claim 10, wherein the first client identifier uniquely identifies a device associated with the SRE, and the second client identifier uniquely identifies a user corresponding to the SRE.

12. The method of claim 9, wherein the private key, associated with the site-specific FIDO security key pair for the target FIDO RP, and the second client identifier are transmitted by the proxy FIDO service, to a user communication device and stored on the user communication device for use in conducting FIDO authentication transactions with the target RP site.

13. The method of claim 9, further comprising:

initiating, by the proxy FIDO application, a FIDO authentication operation between the service requesting entity (SRE) and the target FIDO relying party (RP), using the FID token, wherein the FIDO authentication operation comprises:

signing, by the secure process associated with the proxy FIDO service, a FIDO challenge received from the target FIDO RP using the private key, wherein the private key is stored by the proxy FIDO service, and associated with one or more of the FID token, the first client identifier, the second client identifier, and the site identifier of the target FIDO RP; and transmitting, by the proxy FIDO service, the signed FIDO challenge and the second client identifier to the target FIDO RP, wherein upon validation of the signed FIDO challenge using the public key, a FIDO-authenticated access is provided to the SRE.

14. The method of claim 13, wherein the FIDO authentication operation is initiated in response to a FIDO access request for the target FIDO RP, received from the SRE.

15. The method of claim 13, wherein the FIDO registration and authentication operations occur consecutively during a single session initiated via a FIDO service request received from one or more SREs.

16. The method of claim 15, wherein the FIDO service request corresponds to a FIDO access request initiated by the one or more SREs.

17. The method of claim 15, wherein the mapping between a site-specific FIDO security key pair associated with a target FIDO RP and a corresponding virtual identity token correspond to diversifying the virtual identity token with a site identifier associated with the target FIDO RP.

18. The method of claim 1, further comprising deriving a plurality of virtual identity tokens from the FID token computed for the SRE, wherein each of a plurality of site-specific FIDO security key pairs, for each of a plurality of target FIDO RP sites, is mapped to a distinct virtual identity token.

19. A managed cloud-based Fast Identity Online (FIDO) authenticator system comprising:

a distributed switchboard system in communication with a plurality of FIDO service requesting entities (SREs) and a plurality of FIDO relying parties (RPs), wherein the distributed switchboard system is configured to:

obtain a validation token by transmitting a received first client identifier, associated with an SRE, to a validator entity, and receiving a validation token responsive to a successful authentication of the received first client identifier, from the validator entity;

map the received first client identifier to a second client identifier retrieved from a data store, wherein the second client identifier is associated with the SRE;

generate a FIDO identity (FID) token, for the SRE, using the validation token and the second client identifier;

in response to a FIDO service request from an SRE, compute a FIDO security key pair based on the FID token associated with the SRE, wherein the FIDO security key pair is specified to a target FIDO RP using a first site identifier included in the FIDO service request;

sign a FIDO challenge, received from the target FIDO RP, using a site-specific private key associated with the FIDO security key pair;

transmit the signed FIDO challenge and the second client identifier to the FIDO RP; and upon validation of the signed FIDO challenge, by the FIDO RP, using a site-specific public key associated with the FIDO security key pair, provide the SRE with a FIDO-authenticated access to the FIDO RP.

20. A non-transitory computer medium comprising a processor and memory, the memory storing instructions that when executed by the processor, initiates the processor to perform steps comprising:

obtaining a validation token by authenticating a first client identifier associated with a first FIDO service request, wherein the validation token is obtained in response to an authentication of the first client identifier by a validator entity associated with a first service-requesting entity (SRE);

retrieving a second client identifier from an identity system of records, wherein the second client identifier is obtained in response to mapping the first client identifier to the second client identifier associated with the SRE;

generating a FIDO identity (FID) token from the second client identifier and the validation token, wherein the FID token uniquely identifies and validates the SRE for initiating FIDO transactions;

deriving, based on the FID token, one or more site-specific FIDO security key pairs for one or more target FIDO relying parties (RP), wherein one or more site-specific private keys associated with the one or more site-specific FIDO security key pairs, are stored in association with the FID token and the second client identifier;

responsive to the first FIDO service requests, signing a FIDO challenge, retrieved from a corresponding FIDO RP, with a site-specific private key associated with the corresponding FIDO RP and returning the signed FIDO challenge along with the second client identifier to the target FIDO RP; and providing the first SRE with a FIDO-authenticated access to the FIDO RP in response to a successful validation of the signed FIDO challenge by the target FIDO RP.

* * * * *